United States Patent
Ishihara et al.

(10) Patent No.: US 7,269,258 B2
(45) Date of Patent: Sep. 11, 2007

(54) CRYPTOGRAPHIC KEY, ENCRYPTION DEVICE, ENCRYPTION/DECRYPTION DEVICE, CRYPTOGRAPHIC KEY MANAGEMENT DEVICE, AND DECRYPTION DEVICE

(75) Inventors: Tetsuya Ishihara, Shizuoka (JP); Osamu Ueno, Shizuoka (JP); Yoshikazu Nishino, Shizuoka (JP); Fumiaki Nishiyama, Shizuoka (JP); Takumi Suzuki, Shizuoka (JP); Rei Isogai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 794 days.

(21) Appl. No.: 10/294,776

(22) Filed: Nov. 15, 2002

(65) Prior Publication Data

US 2003/0095659 A1    May 22, 2003

(30) Foreign Application Priority Data

Nov. 16, 2001  (JP)  .............................. 2001-351903
May 31, 2002   (JP)  .............................. 2002-160182

(51) Int. Cl.
*H04L 9/00* (2006.01)
(52) U.S. Cl. ...................... 380/263; 380/46; 708/250; 708/251; 708/252
(58) Field of Classification Search ................ 380/263, 380/46; 708/250–252
See application file for complete search history.

(56) References Cited

U.S. PATENT DOCUMENTS

| | | | | |
|---|---|---|---|---|
| 4,612,413 A | * | 9/1986 | Robert et al. ................ 713/169 |
| 5,048,086 A | * | 9/1991 | Bianco et al. ................ 380/28 |
| 5,201,000 A | * | 4/1993 | Matyas et al. ................ 380/30 |
| 5,717,760 A | * | 2/1998 | Satterfield ..................... 380/28 |
| 6,195,669 B1 | * | 2/2001 | Onodera et al. ............... 708/3 |
| 6,788,787 B1 | * | 9/2004 | Shono et al. ................. 380/46 |

FOREIGN PATENT DOCUMENTS

| | | | |
|---|---|---|---|
| DE | 3426006 A | * | 2/1985 |
| JP | 08-123678 | | 5/1996 |
| JP | 09-160767 | | 6/1997 |
| JP | 2000-310942 | | 11/2000 |
| WO | WO-99/33242 | | 7/1999 |

* cited by examiner

*Primary Examiner*—Kambiz Zand
*Assistant Examiner*—Jacob Lipman
(74) *Attorney, Agent, or Firm*—Finnegan, Henderson, Farabow, Garrett & Dunner, L.L.P.

(57) ABSTRACT

A cryptographic key 1 constituted to be freely attachable and detachable to/from a personal computer 2 encrypting and decrypting data by use of a cipher key includes: a pseudo random number generator 14 for generating a pseudo random number of a chaotic time series based on a data size of the data, a chaotic function and an initial value of the chaotic function; and a USB controller 12 for receiving the data size of the data from the personal computer 2 and transmitting the pseudo random number of the chaotic time series as the cipher key to the personal computer 2, the pseudo random number being generated in the pseudo random number generator 14, when the cryptographic key 1 is attached to the personal computer 2.

13 Claims, 18 Drawing Sheets

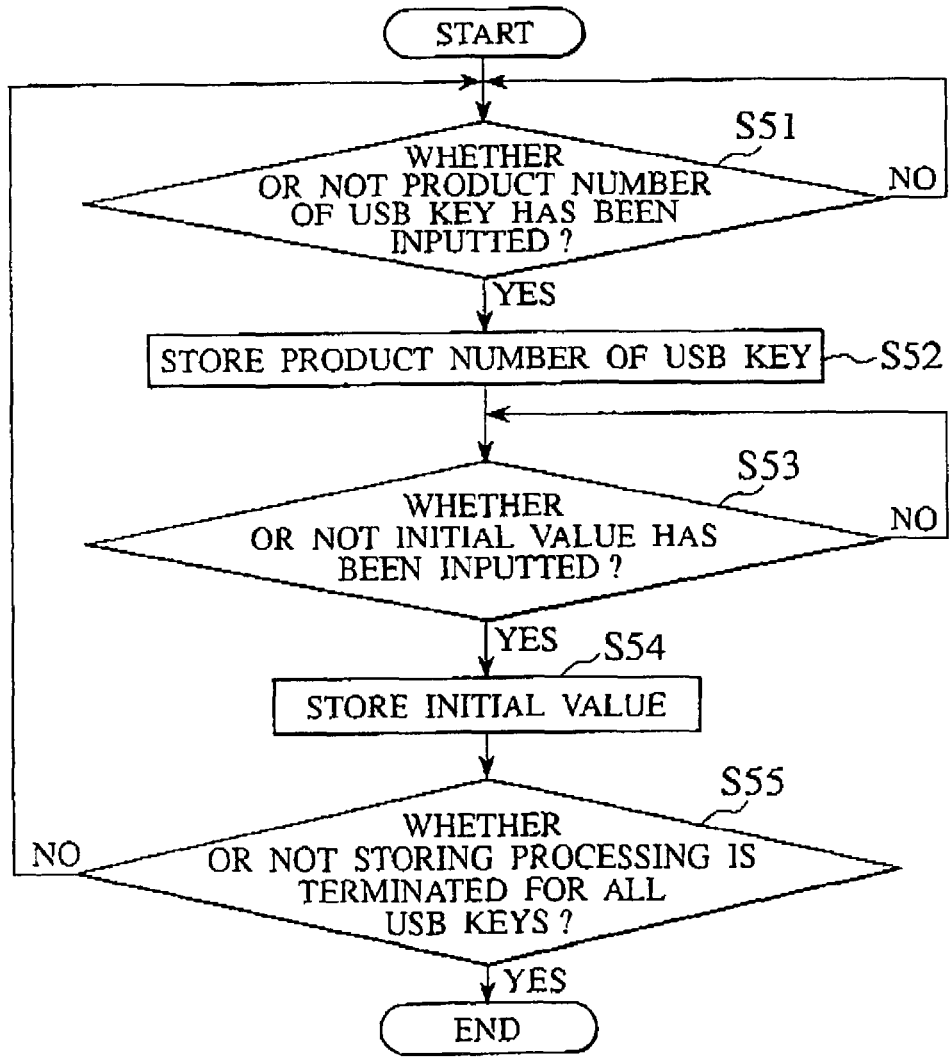

CRYPTOGRAPHIC KEY, ENCRYPTION DEVICE, ENCRYPTION/DECRYPTION DEVICE, CRYPTOGRAPHIC KEY MANAGEMENT DEVICE, AND DECRYPTION DEVICE

BACKGROUND OF THE INVENTION

The present invention relates to a cryptographic key having a pseudo random number generator for generating a pseudo random number of a chaotic time series, an encryption device for encrypting plaintext data by use of the pseudo random number of the chaotic time series from the cryptographic key, an encryption/decryption device for encrypting and decrypting the plaintext data, a cryptographic key management device for managing the cryptographic key, and a decryption device for decrypting cryptographic data.

Recent years, a universal serial bus (USB) has been used as an interface in which the same connector and cable are used coherently for a connection of a personal computer to relatively low-speed peripheral equipment such as a keyboard, a mouse, a speaker, a modem and a printer. In this USB, a data transfer rate between the personal computer and the peripheral equipment is, for example, 1.5 Mbps, which is relatively low-speed.

There has been known an encryption device for encrypting data by use of a personal computer and peripheral equipment, which are in conformity with the standard of the USB as described above. This encryption device is constituted of a key information unit in which key information is registered, and of a personal computer having a cryptographic algorithm, to which the key information unit is attached.

In the key information unit, there is a key information unit in which the key information is registered by a person at the time of purchase thereof, a key information unit in which the key information is registered at the time of shipment thereof from a factory, or the like. Upon being equipped with the key information unit, the personal computer has read out the key information from the key information unit, has created a cipher key from the key information by use of the cryptographic algorithm, and has encrypted plaintext data by use of this cipher key, thus creating cryptographic data.

SUMMARY OF THE INVENTION

However, since the cryptographic algorithm is resident in the personal computer in the conventional encryption device, it will be facilitated for a third party to decipher the cipher key created by the cryptographic algorithm. Therefore, the conventional encryption device has had a problem that plaintext data on a personal computer owned by a person is browsed easily by the third party.

Meanwhile, in the multiuser information and communication toward the next generation, a code division multiple access (CDMA) system will become a mainstream, which uses a spread spectrum communication system excellent in confidentiality and having high performance of removing an interference wave. In this spread spectrum communication system, a pseudo random number generator capable of generating a pseudo random number will become a key device. Here, an important matter on the industrial technology is to realize a pseudo random number generator capable of generating many types of binary sequences that can be reproduced artificially and regarded as pseudo random numbers.

For example, an action such as throwing a coin and shaking a dice is represented as a true random number and has no reproductivity, and thus cannot be used as an industrial technology. On the other hand, unless an unpredictable number sequence is used, a sufficient scramble or spread thereof cannot be realized.

Chaos has been known as one used to meet these two conditions. The chaos contains a wave of every frequency, and the chaos and the random number are very closely related to each other. Hence, it is possible to use a periodic time series of the chaos as the pseudo random number. Therefore, an encryption processing for encrypting data by use of a pseudo random number generator for generating a pseudo random number based on the chaotic time series has been desired.

An object of the present invention is to provide a cryptographic key capable of preventing the data on the personal computer owned by a person from being browsed by the third party easily by making the cryptographic algorithm difficult to be deciphered by the third party, the cryptographic algorithm using the pseudo random number generator for generating the pseudo random number of the chaotic time series.

Another object of the present invention is to provide an encryption device capable of creating cryptographic data having high confidentiality by carrying out the encryption by use of the pseudo random number obtained by the pseudo random number generator owned by the cryptographic key, and to provide an encryption/decryption device and a decryption device, which are capable of decrypting the cryptographic data easily.

Still another object of the present invention is to provide a Cryptographic key management device capable of managing the cryptographic key.

A first aspect of the present invention is a cryptographic key constituted to be freely attachable and detachable to/from an external device encrypting and decrypting data by use of a cipher key, the cryptographic key comprising: a pseudo random number generator for generating a pseudo random number of a chaotic time series based on a data size of the data, a chaotic function and an initial value of the chaotic function; and a transmission/reception control unit for receiving the data size of the data from the external device and transmitting the pseudo random number of the chaotic time series as the cipher key to the external device, the pseudo random number being generated in the pseudo random number generator, when the cryptographic key is attached to the external device.

According to the first aspect of the present invention, the pseudo random number generator is provided in the cryptographic key as a separate body from the external device, and only when the encryption or the decryption is carried out, the cryptographic key is attached to the external device, and the pseudo random number of the chaotic time series is transmitted from the cryptographic key to the external device. Specifically, since the pseudo random number generator (cryptographic algorithm) is not made to reside in the external device but built in the body of the cryptographic key, it becomes difficult for the third party to decipher the pseudo random number of the chaotic time series as the cipher key. Thus, the data on the personal computer owned by a person can be prevented from being browsed by the third party.

A second aspect of the present invention is the cryptographic key according to the first aspect, characterized in that the pseudo random number generator includes: a chaos generation loop constituted by including a pair of one-dimensional map circuits for generating the chaotic function, each having non-linear input/output characteristics, a pair of CMOS switches for alternately performing opening and closing actions for paths on output sides of the respective one-dimensional map circuits in synchronization with an external clock, and a pair of feedback loops for feedbacking analog outputs of the respective one-dimensional map circuits through the respective CMOS switches to input sides of the respective one-dimensional map circuits in a crossing manner; and a pair of AD converters for converting, into digital signals, the analog outputs of the respective one-dimensional map circuits, the analog outputs being taken out through the respective CMOS switches, and the respective one-dimensional map circuits iterate mapping alternately with the elapse of a discrete time defined by the external clock in the chaos generation loop to allow the pseudo random number generator to output binary sequences as chaotic time series through the respective AD converters.

According to the second aspect of the present invention, the respective one-dimensional map circuits iterate the mapping alternately with the elapse of the discrete time defined by the external clock in the chaos generation loop, thus allowing the pseudo random number generator to output binary sequences as chaotic time series through the respective AD converters. Both of the binary sequences taken out alternately are array data, each having a random number with "0" and "1" mixed randomly. The binary sequences arrayed in accordance with the integrated time series are obtained, thus making it possible to generate the pseudo random number of the chaotic time series. Moreover, the pair of one-dimensional circuits iterate the mapping alternately, and the analog outputs obtained by the mapping are feedbacked in the crossing manner. Therefore, divergence and convergence of the analog outputs woven by the pair of one-dimensional map circuits are combined with an initial value sensitivity particular to the chaos, thus breaking an occurrence balance of "0" and "1" of the obtained binary sequences finely Such a swing phenomenon particular to the chaos can contribute to the improvement of robustness of a stream cipher using the chaos.

A third aspect of the present invention is the cryptographic key according to the second aspect, characterized in that the pseudo random number generator further includes: a DA converter for converting an initial value given in a digital signal mode into an analog signal; and a CMOS switch for performing opening and closing actions for a path on an output side of the DA converter in synchronization with the external clock.

According to the third aspect of the present invention, an applied voltage equivalent to a real number is given through the DA converter. A quantization resolution of the DA Converter is being increased, and thus the types of initial values are being increased. Consequently, the types of time series which can be taken out can be increased. In the industrial technology of the chaos, the maintaining of the initial value sensitivity is an extremely important factor. The initial value sensitivity is given through the DA converter. Therefore, with regard to the pair of binary sequences with initial values different from each other as starting points, the both are not superposed on each other even if they are to be superposed while shifting phases thereof in any manner. Thus, it is made possible to obtain the time series in which both auto-correlations and a cross-correlation are sufficiently small.

A fourth aspect of the present invention is the cryptographic key according to the second aspect, characterized in that at least any one of the pair of one-dimensional map circuits is constituted to be capable of adjusting the input/output characteristics of its own in accordance with an external adjustment voltage.

According to the fourth aspect of the present invention, it is made possible to adjust the input/output characteristics owned by the one-dimensional map circuit from the outside. Consequently, the types of the chaotic time series that can be taken out can be further increased.

A fifth aspect of the present invention is an encryption device for encrypting plaintext data by use of a cipher key, the encryption device comprising: a cryptographic key having a pseudo random number generator for generating a pseudo random number of a chaotic time series based on a data size of the plaintext data, a chaotic function and an initial value of the chaotic function; and an external device for transmitting the data size of the plaintext data to the cryptographic key upon being equipped with the cryptographic key, and for encrypting the plaintext data by use of the pseudo random number of the chaotic time series as the cipher key, the pseudo random number being sent from the cryptographic key.

According to the fifth aspect of the present invention, when the cryptographic key is attached to the external device, the external device transmits the data size of the plaintext data to the cryptographic key, and encrypts the plaintext data by use of the pseudo random number of the chaotic time series as the cipher key, the pseudo random number being sent from the cryptographic key Therefore, a similar effect to that of the first aspect is obtained, and cryptographic data having high confidentiality can be created.

A sixth aspect of the present invention is the encryption device so according to the fifth aspect, characterized in that the external device executes an exclusive-OR operation for the pseudo random number obtained by the pseudo random number generator and the plaintext data to encrypt the plaintext data.

According to the sixth aspect of the present invention, the exclusive-OR operation for the pseudo random number obtained by the pseudo random number generator and the plaintext data is executed, thus making it possible to encrypt the plaintext data.

A seventh aspect of the present invention is the encryption device according to the fifth aspect, characterized in that the cryptographic key stores a first password in advance, and the external device collates a password inputted from an input unit and the first password stored in the cryptographic key, and permits an encryption processing when both of the passwords coincide with each other.

According to the seventh aspect of the present invention, the external device permits the encryption processing when the password inputted from the input unit and the first password stored in the cryptographic key coincide with each other. Therefore, the confidentiality can be enhanced.

An eighth aspect of the present invention is an encryption/decryption device for encrypting and decrypting plaintext data by use of a cipher key, the encryption/decryption device comprising: a first cryptographic key having a pseudo random number generator for generating a pseudo random number of a chaotic time series based on a data size of the plaintext data, a chaotic function and an initial value of the chaotic function; a second cryptographic key having a same constitution as the first cryptographic key; a first external device for transmitting the data size of the plaintext data to the first cryptographic key upon being equipped with the first cryptographic key, and for encrypting the plaintext data by use of the pseudo random number of the chaotic time series from the first cryptographic key as the cipher key to create cryptographic data; and a second external device for receiving the cryptographic data from the first external device, for transmitting a data size of the cryptographic data to the second cryptographic key upon being equipped with the second cryptographic key, and for decrypting the cryptographic data by use of the pseudo random number of the chaotic time series from the second cryptographic key as the cipher key.

According to the eighth aspect of the present invention, the first external device transmits the data size of the plaintext data to the first cryptographic key upon being equipped with the first cryptographic key, and encrypts the plaintext data by use of the pseudo random number of the chaotic time series from the first cryptographic key to create the cryptographic data. The second external device receives the cryptographic data from the first external device, and transmits the data size of the cryptographic data to the second cryptographic key upon being equipped with the second cryptographic key, then decrypts the cryptographic data by use of the pseudo random number of the chaotic time series from the second cryptographic key. Therefore, the plaintext data on the transmission side can be obtained on the reception side.

A ninth aspect of the present invention is the encryption/decryption device according to the eighth aspect, characterized in that the first external device executes an exclusive-OR operation for the pseudo random number obtained by the pseudo random number generator in the first cryptographic key and the plaintext data to encrypt the plaintext data, and the second external device executes an exclusive-OR operation for the pseudo random number obtained by the pseudo random number generator in the second cryptographic key and the cryptographic data to decrypt the cryptographic data.

According to the ninth aspect of the present invention, the first external device executes the exclusive-OR operation for the pseudo random number obtained by the pseudo random number generator in the first cryptographic key and the plaintext data to encrypt the plaintext data. Moreover, the second external device executes the exclusive-OR operation for the pseudo random number obtained by the pseudo random number so generator in the second cryptographic key and the cryptographic data to decrypt the cryptographic data. Therefore, the plaintext data on the transmission side can be obtained on the reception side.

A tenth aspect of the present invention is the encryption/decryption device according to the eighth aspect, characterized in that the first cryptographic key stores a first password in advance, the second cryptographic key stores a second password in advance, the first external device collates a password inputted from a first input unit and the first password stored in the first cryptographic key, and permits an encryption processing when both of the passwords coincide with each other, and the second external device collates a password inputted from a second input unit and the second password stored in the second cryptographic key, and permits a decryption processing when both of the passwords coincide with each other.

According to the tenth aspect of the present invention, the encryption processing is permitted on the transmission side when both of the passwords coincide with each other, and the decryption processing is permitted on the reception side when both of the passwords coincide with each other. Therefore, the confidentiality can be enhanced on each of the transmission and reception sides.

An eleventh aspect of the present invention is a cryptographic key management device for managing a cryptographic key constituted to be freely attachable and detachable to/from an external device, characterized in that the cryptographic key includes: a pseudo random number generator for generating a pseudo random number of a chaotic time series based on a data size of data, a chaotic function and an initial value of the chaotic function; a transmission/reception control unit for receiving the data size of the data from the external device and transmitting the pseudo random number of the chaotic time series as the cipher key to the external device, the pseudo random number being generated in the pseudo random number generator, when the cryptographic key is attached to the external device; and a memory having a program area for storing a program, an update password for indicating permission and refusal of update of the program of the program area, and a program update area for storing the update program, the external device includes: a password deletion unit for sending out a delete command to the cryptographic key to delete the update password therefrom when updating the program of the program area in the memory; and a transmission unit for transmitting the update program in a unit of a predetermined length to the cryptographic key after deleting the update password, and the cryptographic key turns into an update mode by the deletion of the update password, and stores the update program from the external device in the unit of the predetermined length in the program update area, then transports the update program in the unit of the predetermined length to the program area, the update program being stored in the program update area.

According to the eleventh aspect of the present invention, the external device sends out the delete command to the cryptographic key to delete the update password therefrom when updating the program of the program area in the memory. Then, the external device transmits the update program in the unit of the predetermined length to the cryptographic key after deleting the update password. Meanwhile, the cryptographic key turns into the update mode by the deletion of the update password, and stores the update program from the external device in the unit of the predetermined length in the program update area. Then, the cryptographic key transports the update program in the unit of the predetermined length to the program area, the update program being stored in the program update area. Therefore, the program in the memory of the cryptographic key can be rewritten from the external device easily, and the rewrite of the application program is determined depending on whether or not the update password exists. Therefore, only a specific person can rewrite the application program.

A twelfth aspect of the present invention is the cryptographic key management device according to the eleventh aspect, characterized in that the transmission unit of the external device transmits the update program and the update password to the cryptographic key, and the cryptographic key stores the update password in the memory when storing the update program in the program update area.

According to the twelfth aspect of the present invention, the cryptographic key can store the update password from the external device in the memory when storing the update program from the external device in the program update area.

A thirteenth aspect of the present invention is the cryptographic key management device according to the twelfth aspect, characterized in that the cryptographic key activates the program of the program area when the update password is stored in the memory when a power source is turned on.

According to the thirteenth aspect of the present invention, the cryptographic key can activate the program of the program area when the update password is stored in the memory when the power source is turned on, thus making it possible to carry out a usual processing.

A fourteenth aspect of the present invention is a cryptographic key management device for managing a cryptographic key constituted to be freely attachable and detachable to/from an external device, characterized in that the external device includes: an initial value table storing a cryptographic key number and an initial value of a chaotic function for each cryptographic key, the cryptographic key number and the initial value being made to correspond to each other; and a transmission unit for reading out the initial value corresponding to the cryptographic key number from the initial value table to transmit the initial value to the cryptographic key when the cryptographic key is attached to the external device, and the cryptographic key includes: a memory for storing the initial value from the external device; and a pseudo random number generator for generating a pseudo random number of a chaotic time series based on the initial value stored in the memory, a data size of data and the chaotic function.

According to the fourteenth aspect of the present invention, the external device reads out the initial value corresponding to the cryptographic key number from the initial value table and transmits the initial value to the cryptographic key upon being equipped with the cryptographic key. The cryptographic key stores the initial value from the external device in the memory, and generates the pseudo random number of the chaotic time series based on the initial value stored in the memory, the data size of the data and the chaotic function. Hence, from the external device, the initial value corresponding to the cryptographic key can be registered in the memory in the cryptographic key for each cryptographic key.

A fifteenth aspect of the present invention is the cryptographic key management device according to the fourteenth aspect, characterized in that the external device includes: an input unit for receiving the cryptographic key number and the initial value for each cryptographic key; and a storage control unit for allowing the initial value table to store the cryptographic key number and the initial value for each cryptographic key, the cryptographic key number and the initial value being inputted from the input unit.

According to the fifteenth aspect of the present invention, when the input unit inputs the cryptographic key number and the initial value for each cryptographic key, the storage control unit allows the initial value table to store the cryptographic key number and the initial value for each cryptographic key, which are inputted from the input unit. Therefore, the initial value can be managed for each cryptographic key by the created initial value table.

A sixteenth aspect of the present invention is a decryption device for decrypting cryptographic data by use of a cryptographic key constituted to be freely attachable and detachable to/from an external device, characterized in that the external device includes: a cryptographic file storing the cryptographic data and a group password inherent in a plurality of users capable of using the cryptographic data; a transmission unit for transmitting the group password and a data size of the cryptographic data to the cryptographic key when an inputted password coincides with the group password stored in the cryptographic file; and a decryption unit for decrypting the cryptographic data in the cryptographic file by use of a cipher key from the cryptographic key, and the cryptographic key includes: a pseudo random number generator for generating a pseudo random number of a chaotic time series based on the data size of the cryptographic data from the external device, a chaotic function and the group password as an initial value of the chaotic function; and a transmission/reception control unit for receiving the group password and the data size of the cryptographic data from the external device, and for transmitting the pseudo random number of the chaotic time series as the cipher key to the external device, the pseudo random number being generated in the pseudo random number generator.

According to the sixteenth aspect of the present invention, the external device transmits the group password and the data size of the cryptographic data to the cryptographic key when the inputted password coincides with the group password stored in the cryptographic file. Meanwhile, the cryptographic key generates the pseudo random number of the chaotic time series based on the data size of the cryptographic data front the external device, the chaotic function and the group password as the initial value of the chaotic function. Then, the cryptographic key transmits the generated pseudo random number of the chaotic time series as the cipher key to the external device The external device decrypts the cryptographic data in the cryptographic file by use of the cipher key from the cryptographic key. Specifically, the group password is defined as the initial value, thus making it possible to share the cryptographic file in the group composed of the plurality of users.

A seventeenth aspect of the present invention is the decryption device according to the sixteenth aspect, characterized in that the external device further includes: a determination unit for determining whether or not group mode information for indicating that the plurality of users can use the cryptographic data is in the cryptographic file; and a request unit for requesting input of the password when the group mode information is in the cryptographic file.

According to the seventeenth aspect of the present invention, the external device determines whether or not the group mode information is in the cryptographic file. When the group mode information is in the cryptographic file, the external device requests input of the password. Therefore, only when there is the group mode information and the inputted password coincides with the group password stored in the cryptographic file, the cryptographic file can be shared in the group composed of the plurality of users.

BRIEF DESCRIPTION OF THE DRAWINGS

FIG. 16 is a diagram showing a constitution of an initial value table in a personal computer of the cryptographic key management device of the fourth embodiment according to the present invention.

FIG. 17 is a flowchart showing a preparation processing of the initial value table by the personal computer of the cryptographic key management device of the fourth embodiment according to the present invention.

DETAILED DESCRIPTION OF THE PREFERRED EMBODIMENTS

Description will be made below in detail with reference to the drawings for embodiments of an encryption device and an encryption/decryption device, each including a cryptographic key according to the present invention.

FIRST EMBODIMENT

Figure 1:
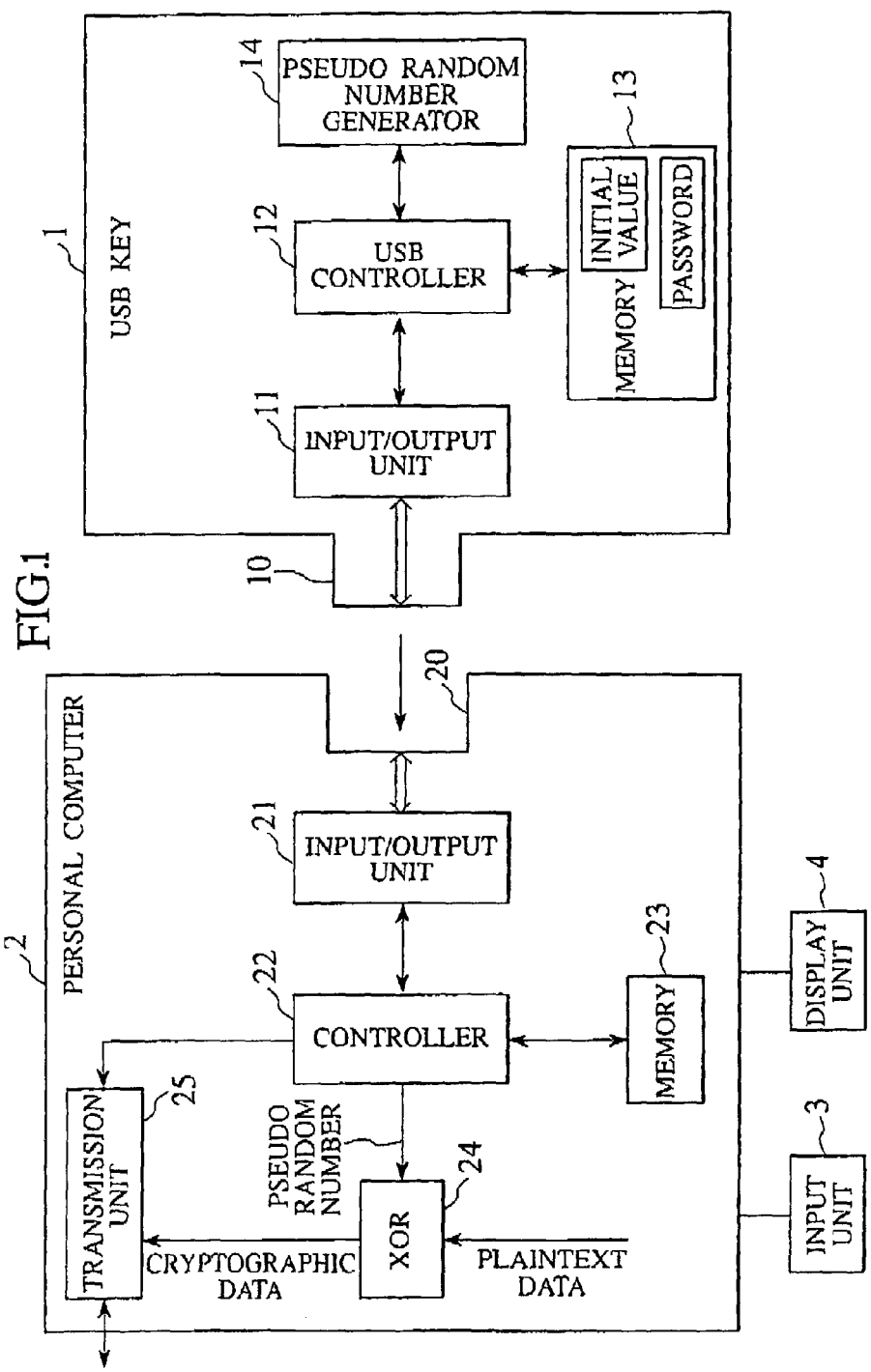
FIG. 1 is a block diagram showing a constitution of an encryption device of a first embodiment according to the present invention.

FIG. 1 is a block diagram showing a constitution of an encryption device of a first embodiment according to the present invention. The encryption device shown in FIG. 1 is constituted by having a personal computer 2 (corresponding to an external device of the present invention) for encrypting plaintext data by use of a cipher key and having a USB key 1 (corresponding to a cryptographic key of the present invention) which is constituted to be freely attachable and detachable to/from the personal computer 2 and adapted to the USB standard Note that the external device may be a mobile terminal such as a cellular phone instead of the personal computer.

The USB key 1 is portable and owned by a person, and a key's protrusion 10 is formed on the USB key 1. This key's protrusion 10 is inserted into a computer's groove 20 formed on the personal computer 2, and thus the USB key 1 and the personal computer 2 are electrically connected to each other, and data communication can be mutually carried out therebetween.

The USB key 1 is constituted by having an input/output unit 11 for administering input/output of data with the personal computer 2, a USB controller 12, a memory 13, and a pseudo random number generator 14.

The pseudo random number generator 14 generates a pseudo random number of a chaotic time series waveform based on a data size of plaintext data, a chaotic function and an initial value of this chaotic function. Description will be made for the pseudo random number based on the chaotic time-series waveform. It is generally known that the chaotic time series waveform behaves irregularly. Therefore, the pseudo random number generator 14 generates the pseudo random number by use of the chaotic time series waveform.

Figure 2:
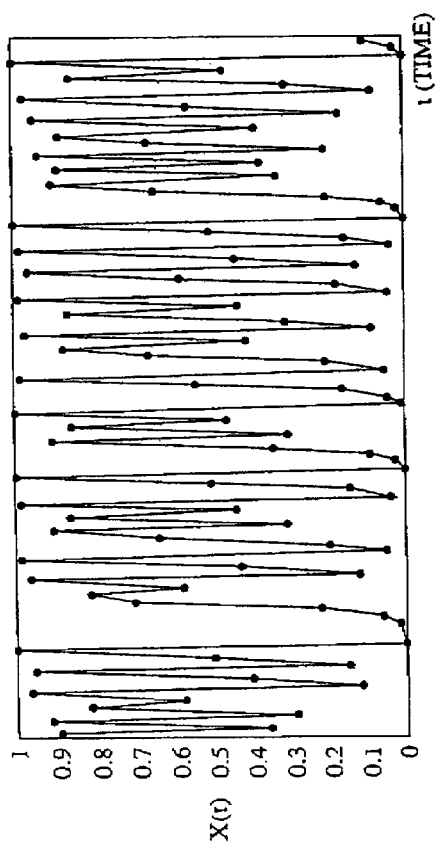
FIG. 2 is a diagram showing a time series waveform of logistic map chaos.

As one of typical models of creating the chaotic time series waveform, there is a logistic map. A formula of this logistic map is represented as a recurrence formula shown in a formula (1).

$$x(t+1)=4x(t)\{1-x(t)\}x(t)=x(t+1) \tag{1}$$

where t is a discrete time, and x(t) corresponds to the above-mentioned chaotic function. When an initial value x(0) is given to the formula (1) and the discrete time (t) is changed from 0 to, for example, 100 for each fixed time Δt (discretely), a chaotic time series waveform based on the logistic map, which is as shown in FIG. 2, is obtained. In FIG. 2, values of x(t) for each fixed time Δt are plotted.

This logistic map is a time series waveform where the values iterate increase/reduction, and a state of the time series waveform is greatly changed by a slight change of the initial value x(0). Specifically, the formula of the logistic map depends on the initial value x(0) sensitively. This is referred to as an initial value sensitivity. Therefore, plural types of pseudo random numbers of the chaotic time series waveforms can be generated by changing the initial value x(0), thus making it possible to fabricate plural types of USB keys 1.

Furthermore, because of nonlinear characteristics of the formula of the logistic map, x(t) does not take the same value twice and has irreversibility. Therefore, since the value of x(t) cannot be predicted by a simple inverse calculation, confidentiality thereof can be enhanced.

Note that description will be made later in detail for a concrete circuit configuration of the pseudo random number generator.

The memory 13 stores the initial value of the chaotic function and a password of a person owning the key. The USB controller 12 (corresponding to a transmission/reception control unit of the present invention) controls the respective units. When the USB key 1 is attached to the personal computer 2, the USB controller 32 receives a data size of plaintext data from the personal computer 2 and transmits the pseudo random number of the chaotic time series generated in the pseudo random number generator 14 as the cipher key to the personal computer 2.

Here, the one actually used as the cryptographic key is a pseudo random number having a size corresponding to the above-described data size among the pseudo random numbers of the above-described chaotic time series. The case where the pseudo random number of the chaotic time series is used as the cryptographic key in the following description also implies the above matter.

The personal computer 2 transmits the data size of the plaintext data to the USB key 1 when the USB key 1 is attached thereto, and encrypts the plaintext data by use of the pseudo random number of the chaotic time series, which is sent from the USB key 1, as the cipher key. The personal computer 2 is constituted by having an input/output unit 21 for administering input/output of data with the USB key 1, a controller 22, a memory 23 for storing the personal password, various data and the like, which are inputted from an input unit 3, an exclusive-OR circuit (hereinafter, abbreviated as XOR) 24, and a transmission unit 25 The input unit 3 for inputting the plaintext data, other various data and the like to the personal computer 2 and a display unit 4 for displaying the data on a screen are connected to the personal computer 2.

When the USB key 1 is attached to the personal computer 2, the controller 22 receives an attachment signal from the USB key 1, transmits the number of bytes of the plaintext data (the number corresponding to the data size of the present invention) to the USB key 1, and receives, from the USB key 1, the pseudo random number of the chaotic time series, which is obtained by the pseudo random number generator 14. Moreover, the controller 22 collates the password inputted from the input unit 3 and the password stored in the USB key 1, and permits the encryption processing when both of the passwords coincide with each other. The XOR 24 executes an exclusive-OR operation for the pseudo random number of the chaotic time series from the controller 22 and the plaintext data, and thus encrypts the plaintext data. Then, the XOR 24 outputs the obtained cryptographic data to the transmission unit 25.

Figure 3:
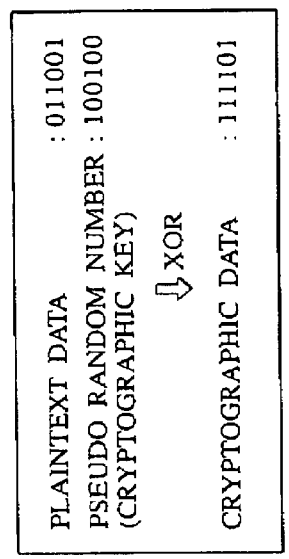
FIG. 3 is a diagram explaining a concrete example of encryption using a pseudo random number as a cipher key.
Figure 4:
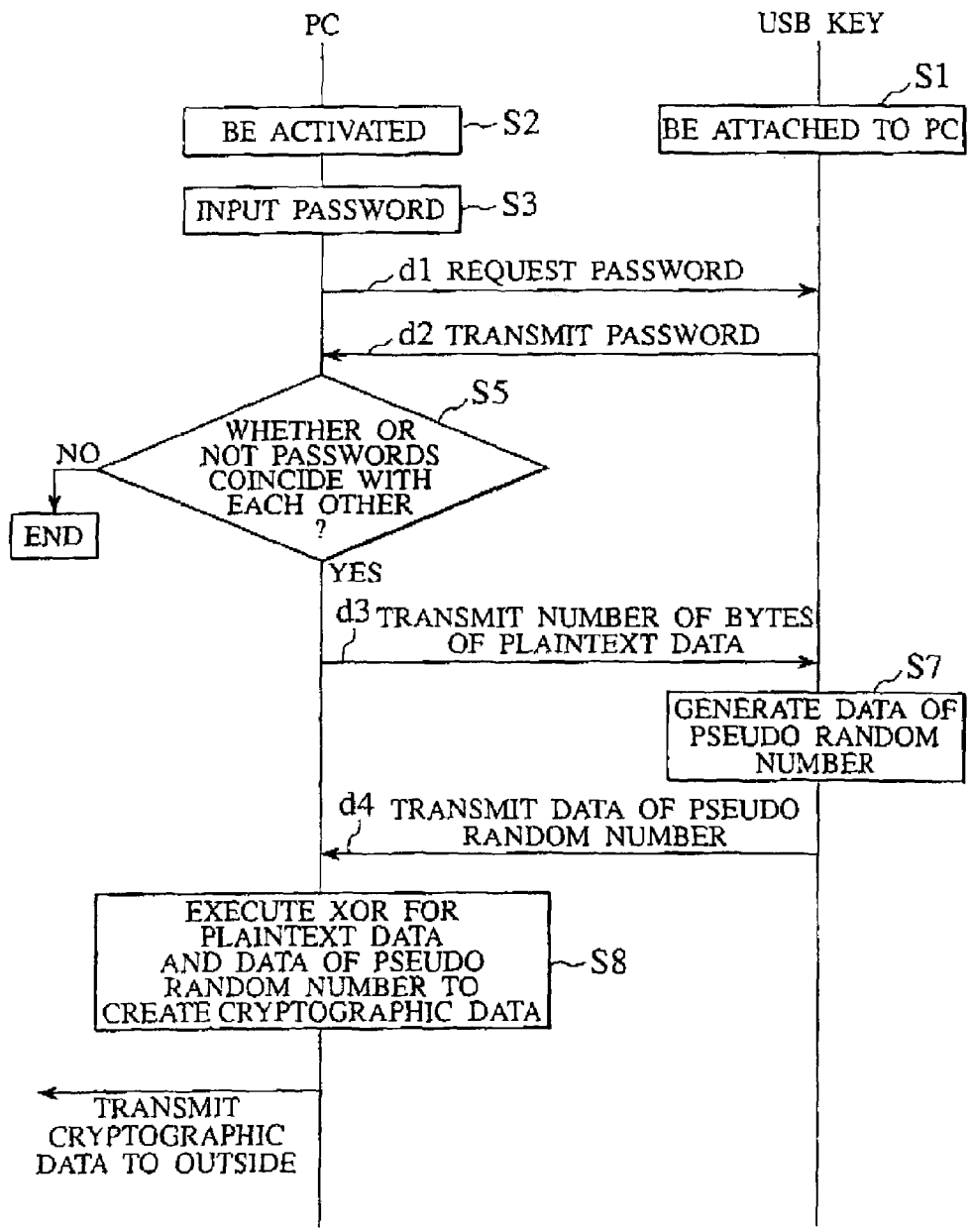
FIG. 4 is a sequence diagram explaining an encryption processing on a transmission side.

Next, description will be made in detail for an action of the encryption device including the cryptographic key constituted as described above with reference to FIG. 1 to FIG. 4. FIG. 3 is a diagram explaining a concrete example of the encryption using the pseudo random number as the cipher key. FIG. 4 is a sequence diagram explaining an encryption processing on a transmission side.

First, the USB key 1 is attached to the personal computer 2 (Step S1), and the personal computer 2 is activated (Step S2). Then, a password of a user is inputted to the personal computer 2 from the input unit 3 (Step S3).

Next, the personal computer 2 makes a request for a password to the USB key 1 (d1) In the USB key 1, in response to the request for the password, the USB controller 12 reads out the password from the memory 13 and transmits this password to the personal computer 2 (d2).

Next, the controller 22 in the personal computer 2 determines whether the password inputted from the input unit 3 has coincided with the password stored in the USB key 1 (Step S5). When both of the passwords do not coincide with each other, the encryption processing is not carried out. When both of the passwords coincide with each other, the encryption processing is permitted, and the number of bytes of the plaintext data is transmitted to the USB key 1 (d3).

In the USB key 1, the pseudo random number generator 14 generates the pseudo random number of the chaotic time series based on the number of bytes of the received plaintext data, the chaotic function and the initial value of this chaotic function (Step S7). Then, the USB controller 12 transmits the pseudo random number of the chaotic time series, which is obtained by the pseudo random number generator 14 and has a size corresponding to this data size, to the personal computer 2 (d4).

In the personal computer 2, the XOR 24 executes the exclusive-OR operation for the pseudo random number from the controller 22 and the plaintext data, and thus carries out the encryption for the plaintext data. Then, the XOR 24 outputs the obtained cryptographic data to the transmission unit 25 (Step S8). For example, as shown in FIG. 3, the plaintext data is defined as "011001," the random number as the cipher key is defined as "100100," and an XOR of the both is taken. Then, "111101" is obtained as cryptographic data. The transmission unit 25 transmits the cryptographic data from the XOR 24 to the outside. Moreover, the cryptographic data is stored in the memory 23.

As described above, according to the encryption device of the first embodiment, the pseudo random number generator 14 is provided in the USB key 1 as a separate body from the personal computer 2, and only when the encryption is carried out, the USB key 1 is attached to the personal computer 2, and the pseudo random number of the chaotic time series is transmitted from the USB key 1 to the personal computer 2. Specifically, since the pseudo random number generator 14 (cryptographic algorithm) is not provided in the personal computer 2 but built in the body of the USB key, it becomes difficult for the third party to decipher the pseudo random number of the chaotic time series as the cipher key. Thus, the data on the personal computer owned by a person can be prevented from being browsed by the third party.

Moreover, files of various formats such as a document and an image can be encrypted only by inserting the USB key 1 into the personal computer 2 at the time of use thereof. Furthermore, if a destination also possesses such a USB key 1, then a confidential cryptographic mail by the cryptographic data can be transmitted to the destination.

Moreover, since the pseudo random number generator 14 is not provided in the personal computer 2, a processing load of the personal computer 2 can be reduced.

Furthermore, since the encryption processing cannot be carried out if the password on the USB key 1 side and the password on the personal computer 2 side do not coincide with each other, the confidentiality thereof can be further improved.

Moreover, since the plural types of pseudo random numbers of the chaotic time series can be generated by changing the initial value x(0), plural types of the USB keys 1 can be fabricated, thus making it possible to use the keys in plural groups.

Moreover, since the pseudo random number of the chaotic time series can be generated at a high speed, the mode of this embodiment has an encryption processing speed which is approximately 80 times that of a data encryption standard (DES) mode as a conventional general encryption mode.

SECOND EMBODIMENT

Next, description will be made in detail for an encryption/decryption device of a second embodiment according to the present invention. This encryption/decryption device is characterized in that it encrypts plaintext data on a transmission side and transmits the data to a reception side, then decrypts the cryptographic data received by the reception side, thus obtaining the original plaintext data.

Figure 5:
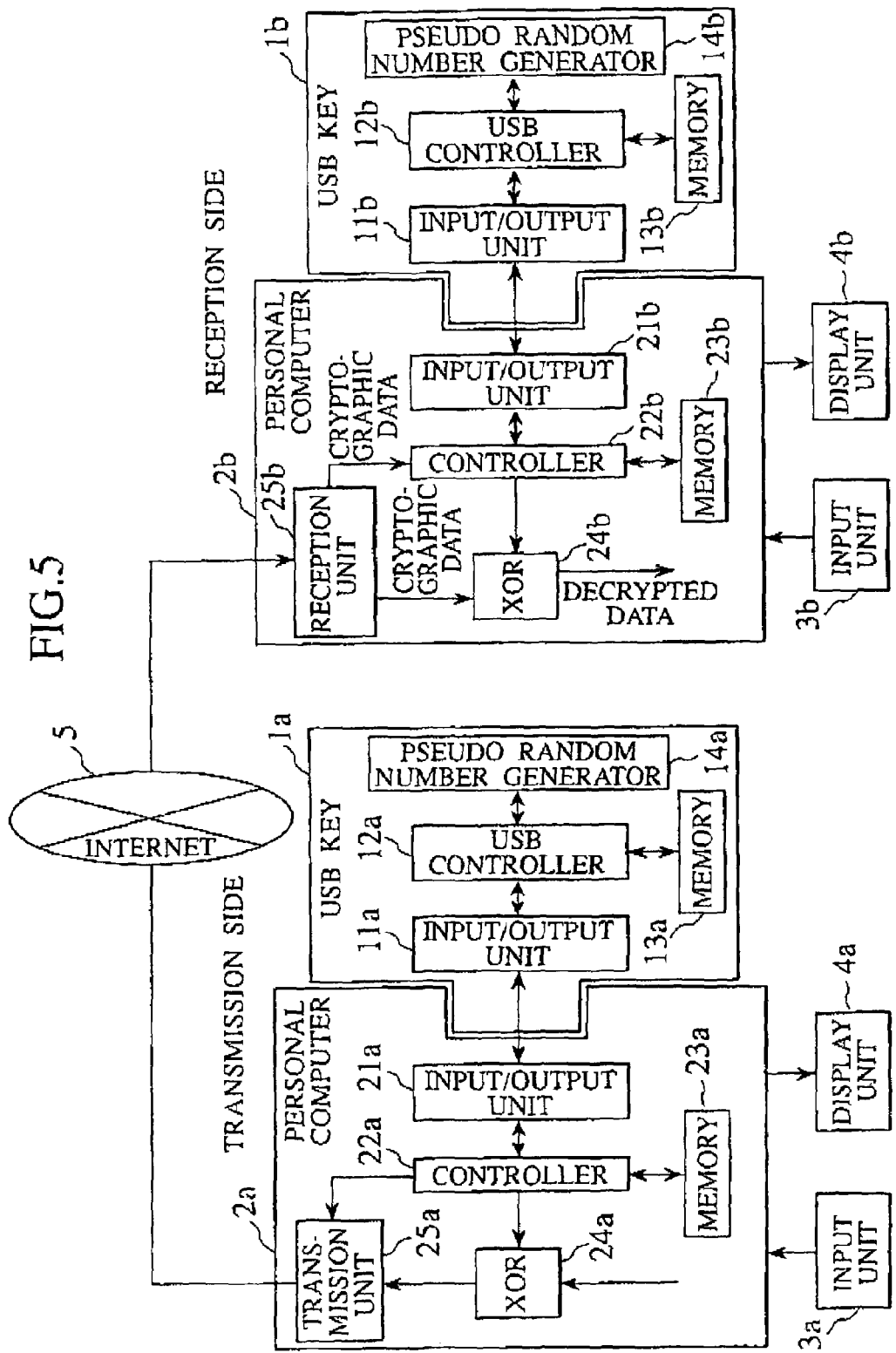
FIG. 5 is a block diagram showing a constitution of an encryption/decryption device of a second embodiment according to the present invention.

FIG. 5 is a block diagram showing a constitution of the encryption/decryption device of the second embodiment according to the present invention. As shown in FIG. 5, the encryption/decryption device is constituted by having a personal computer 2a of the transmission side, a USB key 1a attached to this personal computer 2a, a personal computer 2b of the reception side, a USB key 1b attached to this personal computer 2b, and the Internet 5 for carrying out mutual data communication between both of the personal computers 2a and 2b.

The USB key 1a of the transmission side has the same constitution and function as those of the USB key 1 shown in FIG. 1, is constituted to be freely attachable and detachable to/from the personal computer 2a, and is constituted by having an input/output unit 11a, a USB controller 12a, a memory 13a and a pseudo random number generator 14a. The personal computer 2a of the transmission side has the same constitution and function as those of the personal computer 2 shown in FIG. 1, and is constituted by having an input/output unit 21a, a controller 22a, a memory 23a, an XOR 24a and a transmission unit 25a. AD input unit 3a and a display unit 4a are connected to the personal computer 2a.

The USB key 1b of the reception side has the same constitution and function as those of the USB key 1a, is constituted to be freely attachable and detachable to/from the personal computer 2b, and is constituted by having an input/output unit 11b, a USB controller 32b, a memory 13b and a pseudo random number generator 14b. The memory 13b stores a password of a person owning a key and an initial value equal to an initial value $x(0)$ of a chaotic function $x(t)$ generated in the pseudo random number generator 14a of the transmission side. The USB controller 12b controls the respective units. When the USB key 1b is attached to the personal computer 2b, the USB controller 12b receives a data size of the cryptographic data from the personal computer 2b, and transmits the pseudo random number of the chaotic time series generated in the pseudo random number generator 14b as a cipher key to the personal computer 2.

The personal computer 2b of the reception side has approximately the same constitution and the same function as those of the personal computer 2a. Upon being equipped with the USB key 1b, the personal computer 2b transmits the data size of the cryptographic data to the USB key 1b, and decrypts the cryptographic data by use of the pseudo random number of the chaotic time series, which is sent from the USB key 1b, as the cipher key. The personal computer 2b is constituted by having an input/output unit 21b, a controller 22b, a memory 23b, an XOR 24b and a reception unit 25b. An input unit 3b and a display unit 4b are connected to the personal computer 2b.

The reception unit 25b receives the cryptographic data from the transmission side through the Internet 5 and transmits the received cryptographic data to the controller 22b and the XOR 24b. Upon being equipped with the USB key 1b, the controller 22b receives an attachment signal from the USB key 1b, transmits the number of bytes of the cryptographic data to the USB key 1b, and receives the pseudo random number of the chaotic time series, which is obtained by the pseudo random number generator 14b, from the USB key 1b. Moreover, the controller 22b collates the password inputted from the input unit 3b and the password stored in the USB key 1b, and permits the encryption processing when both of the passwords coincide with each other. The XOR 24b executes an exclusive-OR operation for the pseudo random number of the chaotic time series from the controller 22b and the cryptographic data, and thus carries out the decryption for the cryptographic data. Then, the XOR 24b obtains plaintext data as the decrypted data.

Figure 6:
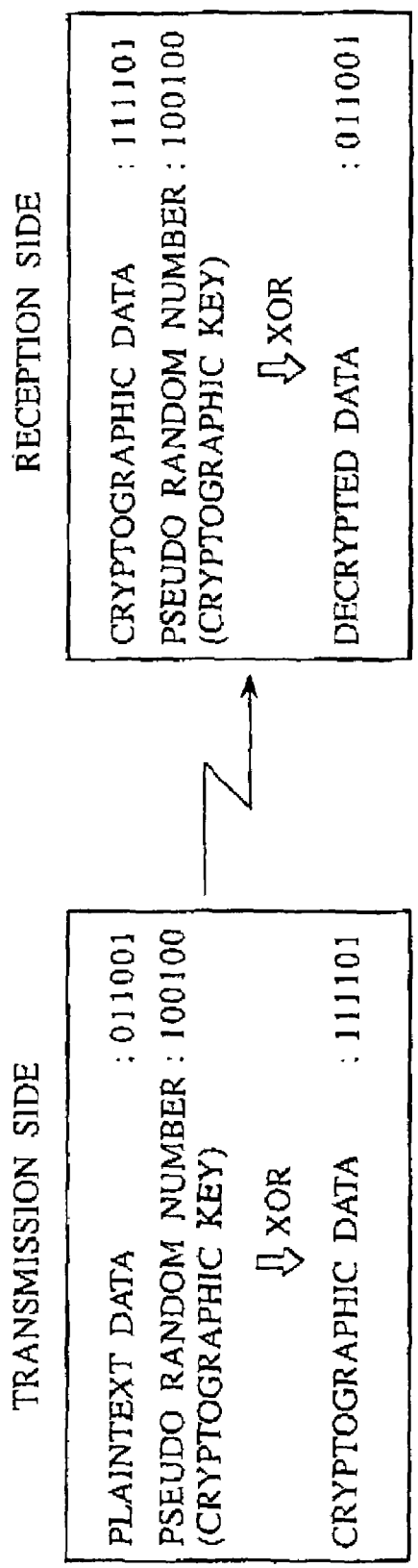
FIG. 6 is a diagram explaining a concrete example of encryption and decryption, which use the pseudo random number as the cipher key.
Figure 7:
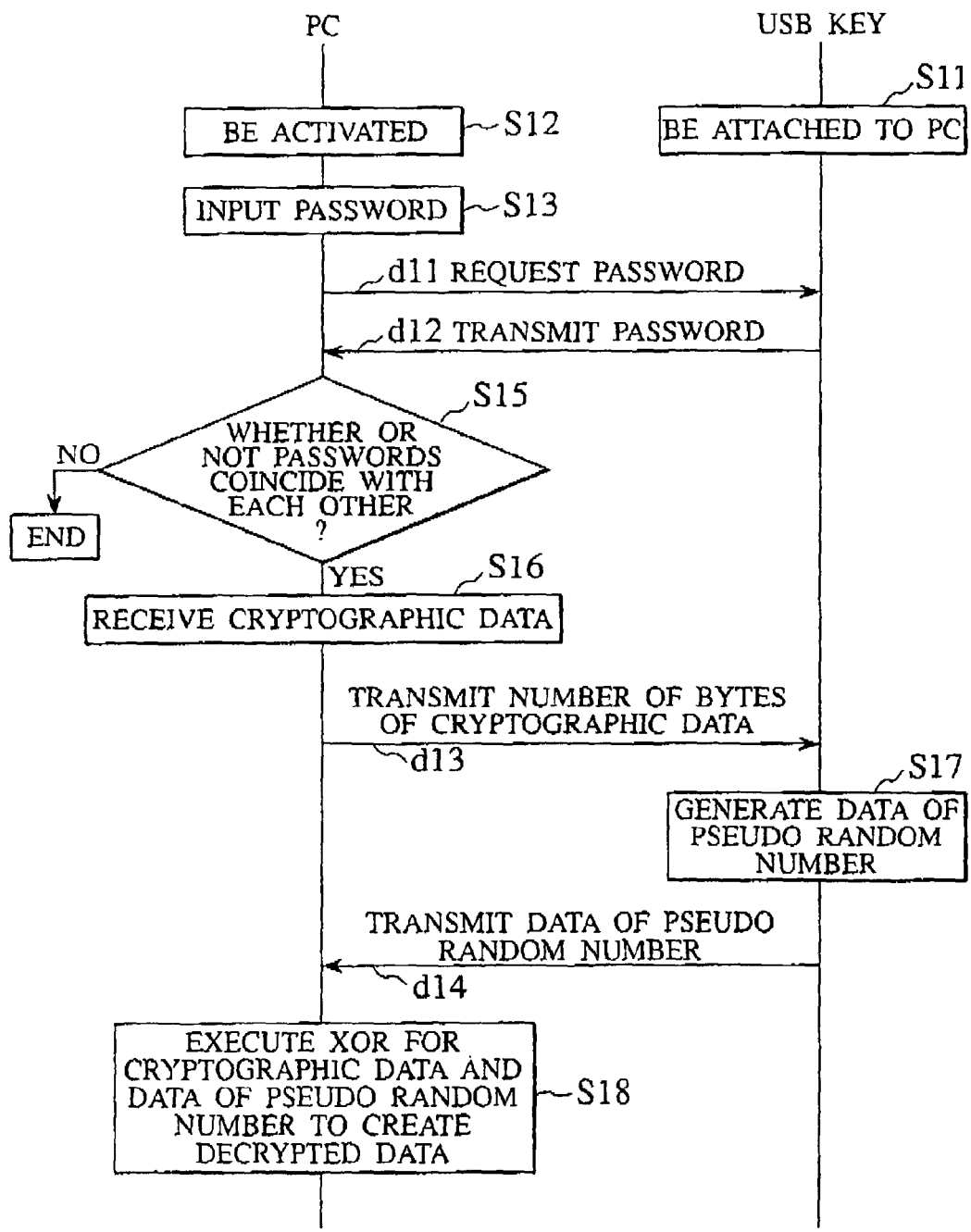
FIG. 7 is a sequence diagram explaining a decryption processing on a reception side.

Next, description will be made for an action of the encryption/decryption device constituted as described above. FIG. 6 is a diagram explaining a concrete example of the encryption and decryption, which use the pseudo random number as the cipher key. FIG. 7 is a sequence diagram explaining a decryption processing on the reception side.

Note that the encryption processing by the personal computer 2a and the USB key 1a on the transmission side is the same as the processing in the sequence diagram shown in FIG. 4. Therefore, here, description thereof will be omitted, and description will be made only for a decryption processing by the personal computer 2b and the USB key 1b on the reception side.

First, the cryptographic data is transmitted to the personal computer 2b of the reception side through the Internet 5.

Meanwhile, on the reception side, the USB key 1b is attached to the personal computer 2b (Step S11), and the personal computer 2b is activated (Step S12). Then, a password of a user is inputted from the input unit 3b to the personal computer 2b (Step S13).

Next, the personal computer 2b makes a request for a password to the USB key 1b (d11). In the USB key 1b, in response to the request for the password, the USB controller 12b reads out the password from the memory 13b, and transmits this password to the personal computer 2b (d12).

Next, the controller 22b in the personal computer 2b determines whether the password inputted from the input unit 3b has coincided with the password stored in the USB key 1b (Step S15). When both of the passwords do not coincide with each other, the decryption processing is not carried out. When both of the passwords coincide with each other, the decryption processing is permitted, and the number of bytes of the cryptographic data is transmitted to the USB key 1b (d13).

In the USB key 1b, the pseudo random number generator 14b generates the pseudo random number of the chaotic time series based on the number of bytes of the received cryptographic data, the chaotic function and the initial value of this chaotic function (Step S17) Then, the USB controller 12b transmits the pseudo random number obtained by the pseudo random number generator 14b to the personal computer 2b (d14).

In the personal computer 2b, the XOR 24b executes the exclusive-OR operation for the pseudo random number from the controller 22b and the cryptographic data, and thus carries out the decryption for the cryptographic data. Then, the XOR 24b obtains the plaintext data as the decrypted data (Step S18). For example, as shown in FIG. 6, the cryptographic data is defined as "111101," the random number as the cipher key is defined as "100100," and an XOR of the both is taken. Then, "011001" is obtained as decrypted data, which becomes equal to the plaintext data.

As described above, according to the encryption/decryption device of the second embodiment, since the USB key 1a and the personal computer 2a constitute the encryption device, a similar effect to that of the encryption device of the first embodiment is obtained.

Moreover, the pseudo random number generator 14b is provided in the USB key 1b as a separate body from the personal computer 2b, and only when the decryption is carried out, the USB key 1b is attached to the personal computer 2b, and the pseudo random number is transmitted from the USB key 1b to the personal computer 2b. Specifically, since the pseudo random number generator 14b is not made to reside in the personal computer 2b but built in the body of the USB key, it becomes difficult for the third party to decipher the pseudo random number of the chaotic time series as the cipher key. Moreover, since a file composed of the data cannot be browsed without the USB key 1b, confidentiality thereof can be enhanced.

In this case, the same initial value $x(0)$ is given to the pseudo random number generator 14a of the transmission side for the encryption and the pseudo random number generator 14b of the reception side for the decryption, respectively. Therefore, the pseudo random number for the encryption and the pseudo random number for the description are maintained to be the same. Moreover, the cryptographic data can be decrypted while being synchronized between the transmission and reception sides by utilizing characteristics of the exclusive-OR operation. The characteristics of the exclusive-OR operation are as follows. First, cryptographic data is obtained by taking an exclusive-OR of certain plaintext data and a certain pseudo random number. Then, when another exclusive-OR of the above cryptographic data and the same pseudo random number is taken, the cryptographic data return to the original plaintext data. ID such a manner as described above, necessary plaintext data can be communicated accurately to a destination.

Moreover, since the pseudo random number generator 14b is not provided in the personal computer 2b, a processing load of the personal computer 2b can be reduced.

Furthermore, since the decryption processing cannot be carried out unless the password on the USB key 1b side and the password on the personal computer 2b side coincide with each other, the confidentiality thereof can be further improved.

Moreover, since the plural types of pseudo random numbers of the chaotic time series can be generated by changing the initial value x(0), plural types of the USB keys 1 can be fabricated, thus making it possible to use the keys in plural groups.

Figure 8:
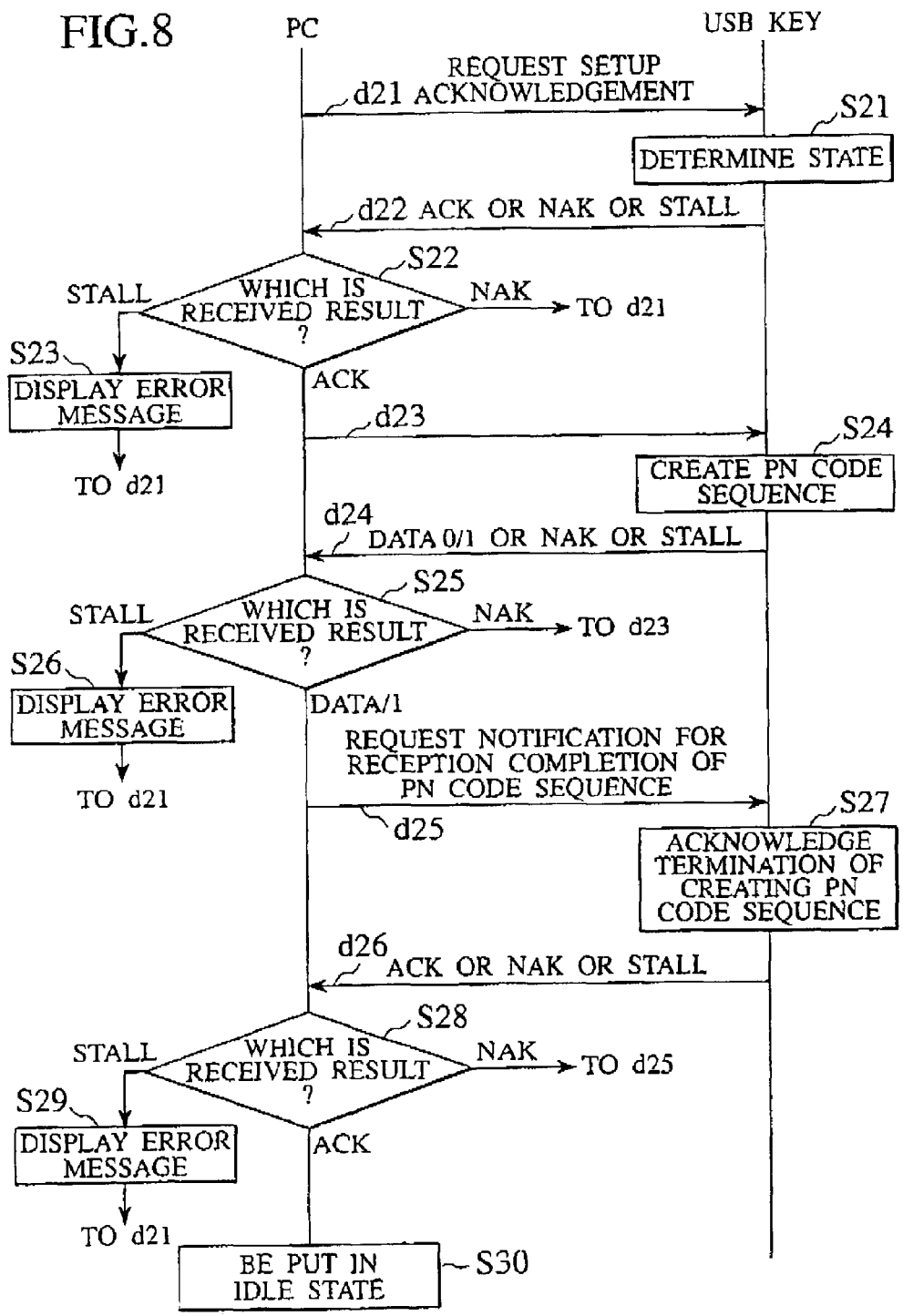
FIG. 8 is a sequence diagram showing in detail a communication processing between a USB key and a personal computer.

Next, description will be made in detail for a communication processing between the USB key and the personal computer, which are provided on each of the transmission side and the reception side, with reference to the sequence diagram of FIG. 8.

First, the personal computer 2 makes a request for setup acknowledgment to the USB key 1 (d21). Then, the USB key 1 determines a state of its own (Step S21). As a determination result thereof, the USB key 1 returns ACK (setup OK), NAK (under another processing or setup NG) or STALL (some errors) to the personal computer 2 (d22).

Next, the personal computer 2 receives the determination result of the USB key 1 and determines which of ACK, NAK and STALL the received result is (Step S22). When the received result is NAK, the processing returns to d21, and when the result is STALL, an error message is displayed (Step S23). When the result is ACK, the personal computer 2 transmits cipher key information (data size) to the USB key 1, and makes a request for creation of a pseudo random number (PN code) thereto (d23).

Meanwhile, in the USB key 1, the pseudo random number generator 14 creates a PN code sequence of the chaotic time series based on the data size of the cipher key information, the chaotic function and the initial value of the chaotic function (Step S24). Then, the USB key 1 returns DATA0/1 (PN code sequence data composed of "0" and "1"), NAK (under creation of the PN code sequence) or STALL (some errors) to the personal computer 2 depending on a state of creating the PN code sequence (d24).

Next, the personal computer 2 receives the determination result of the USB key 1 and determines which of DATA0/1, NAK and STALL the received result is (Step S25). When the received result is NAK, the processing returns to d23, and when the result is STALL, an error message is displayed (Step S26). When the result is DATA0/1, the personal computer 2 makes a request to the USB key 1 for notification of completing the reception of the PN code sequence (d25).

In the USB key 1, the termination of creating the PN code sequence is acknowledged (Step S27). Depending on the creation state, the USB key 1 returns ACK (termination acknowledged), NAK (under some processings) of STALL (some errors) to the personal computer 2 (d26).

Next, the personal computer 2 receives the determination result of the USB key 1, and determines which of ACK, NAK and STALL the received result is (Step S28). When the received result is NAK, the processing returns to d25, and when the result is STALL, an error message is displayed (Step S29). When the result is ACK, the personal computer 2 is on standby, that is, in an idle state until the next command (Step S30).

As described above, the USB key 1 is attached to the personal computer 2, and thus communication through USB ports can be carried out during the encryption and the decryption.

Pseudo Random Number Generator

Figure 9:
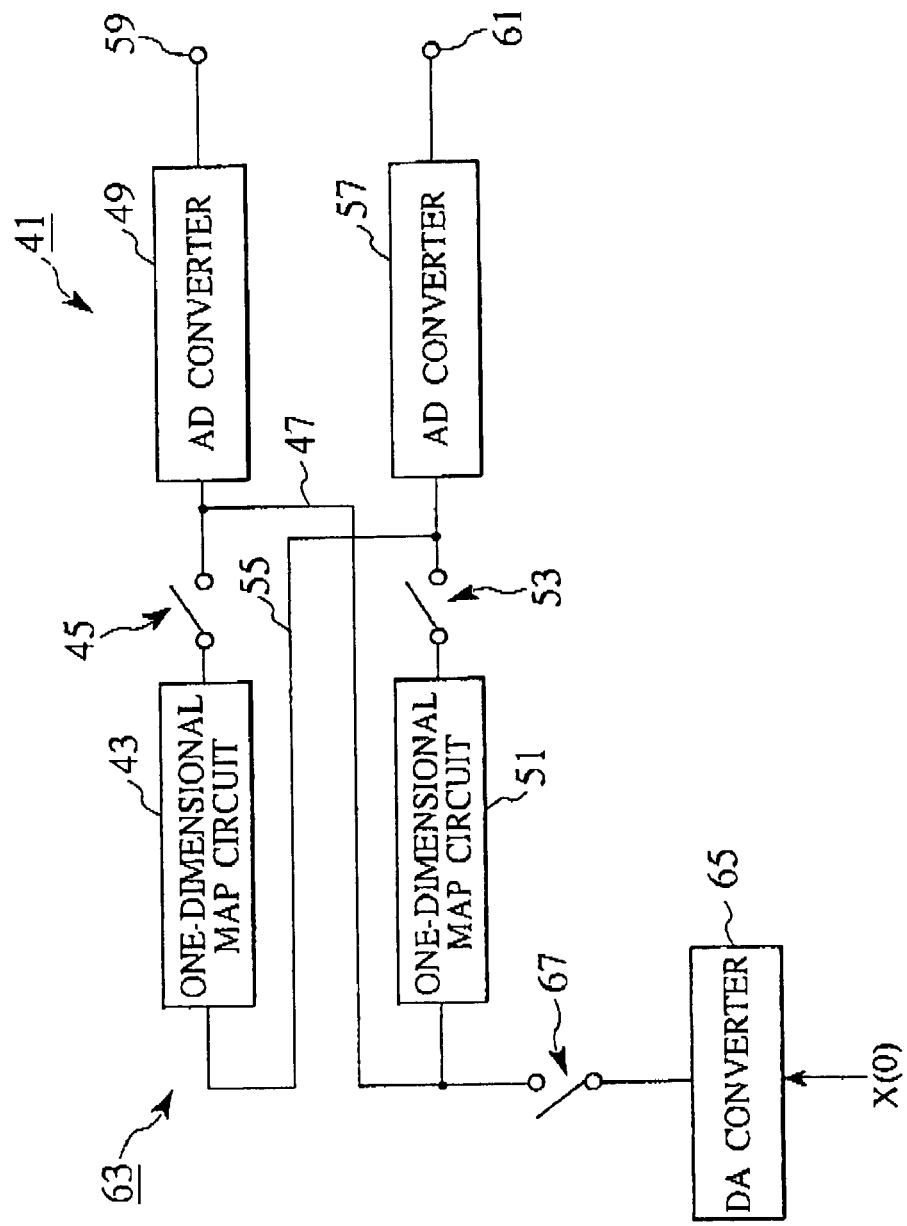
FIG. 9 is a block diagram schematically showing a constitution of a pseudo random number generator.

Next, description will be made for a concrete circuit configuration of the above-mentioned pseudo random number generator 14. FIG. 9 is a block diagram schematically showing a constitution of the pseudo random number generator. As shown in FIG. 9, the pseudo random number generator 14 is constituted by including; a chaos generation loop 63 constituted by including a pair of one-dimensional map circuits 43 and 51 of one-input ore-output mode for generating the chaotic function, each having non-linear input/output characteristics, a pair of CMOS switches 45 and 53 for alternately performing opening and closing actions for paths on output sides of the respective one-dimensional map circuits 45 and 53 in synchronization with an external clock, and a pair of feedback loops 47 and 55 for feedbacking analog outputs of the respective one-dimensional map circuits 43 and 51 through the respective CMOS switches 45 and 53 to input sides of the one-dimensional map circuits 43 and 51 in a crossing manner; a pair of AD converters 49 and 57 for converting, into digital signals, the analog outputs of the respective one-dimensional map circuits 43 and 51, which are taken out through the respective CMOS switches 45 and 53; a DA converter 65 for converting an initial value x(0) given in a digital signal mode into an analog signal; and a CMOS switch 67 for performing opening and closing actions for a path on an output side of the DA converter 65 in synchronization with the external clock.

With the elapse of a discrete time t (0, 1, 2, . . . ) defined by the to external clock in the chaos generation loop 63, the respective one-dimensional map circuits 43 and 51 iterate the mapping alternately. Thus, the pseudo random number generator 14 outputs binary sequences as chaotic time series through the respective AD converters 49 and 57.

Figure 10:
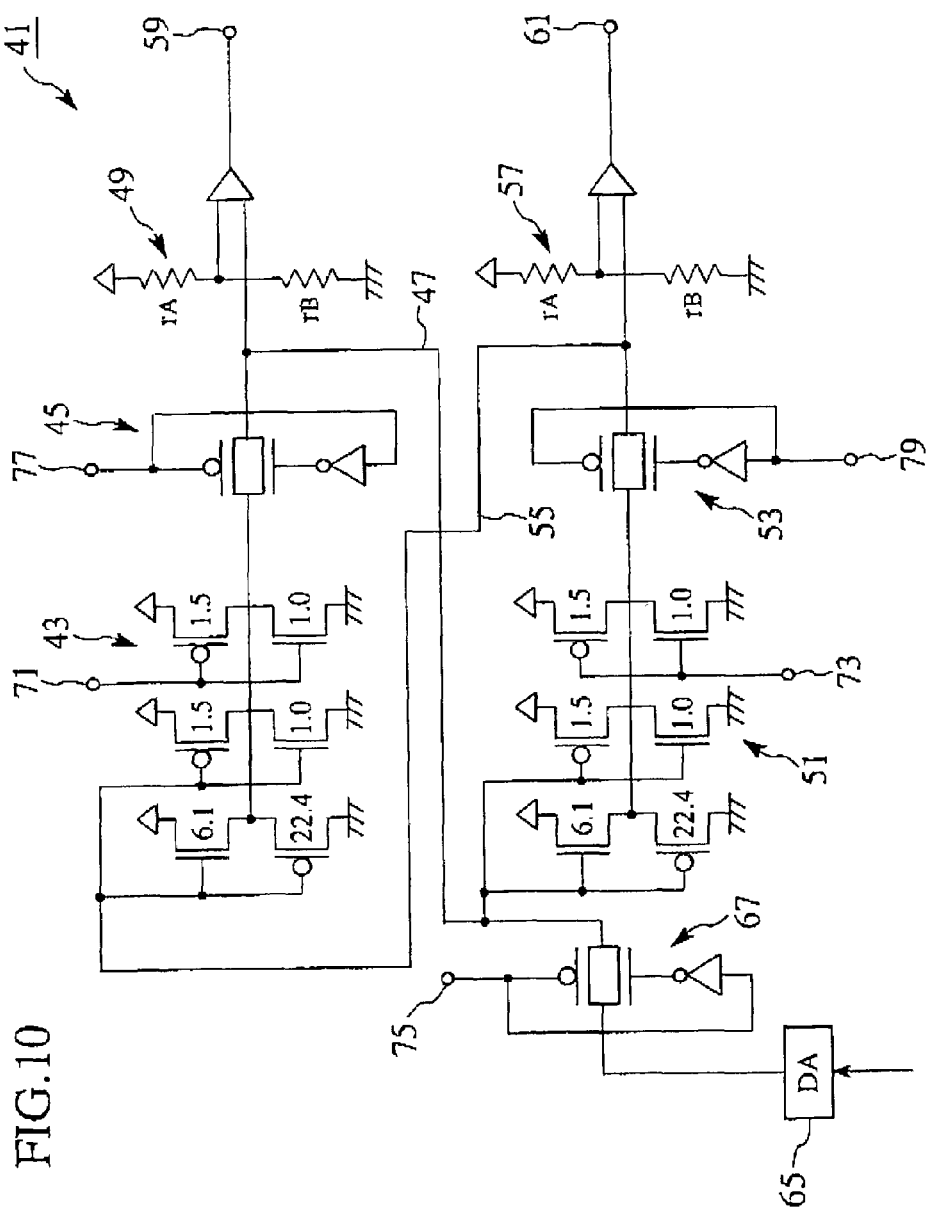
FIG. 10 is a diagram showing a circuit obtained by integrating the pseudo random number generator.

FIG. 10 is a diagram showing a circuit obtained by integrating the pseudo random number generator 14 shown in FIG. 9. Note that FIG. 9 and FIG. 10 are drawn so as to correspond to each other, and that common reference numerals are added to members common to both of the drawings. An internal constitution for each block of the pseudo random number generator 14 shown in FIG. 9 will be mentioned with reference to FIG. 10.

Each of the one-dimensional map circuits 43 and 51 having input/output characteristics of an approximately "N" shaped form is constituted by including six MOS transistors. In FIG. 10, a channel dimension ratio W/L (where W is a width and L is a length) of each transistor is represented as a weight by a number. A CMOS inverter at the first stage gives an increasing function, and a CMOS inverter at the second stage gives a decreasing function. Function composition is carried out by standardizing inputs and outputs of both of the CMOS inverters, and consequently, the input/output characteristics of the approximately "N" shaped form are obtained.

Upon receiving external adjustment voltages 71 and 73, a CMOS inverter at the third stage distorts the input/output characteristics owned by the one-dimensional map circuits 43 and 51. Voltage values of the external adjustment voltages 71 and 73 may be equal to each other, Or may be different from each other. Furthermore, at least any one of the external adjustment voltages 71 and 73 may be omitted.

The external adjustment voltages given to input terminals 71 and 73 may be given by converting digital codes preset by the computer into analog voltages by the DA converter, In this case, the values of the external adjustment voltages are changed in the form of step in accordance with a quantization resolution of the DA converter.

Each of CMOS switches 45, 53 and 67 is constituted by combining the CMOS inverter with a transmission gate in which a PMOS transistor and an NMOS transistor are connected in parallel. The CMOS switch is opened and closed in accordance with a control signal given to each of input terminals 75, 77 and 79.

A reset pulse giving an initial value is applied to the input terminal 75, and the value of the initial value x(0) is given through the DA converter 65. Specifically, the initial value x(0) of the inner state of the loop at the discrete time t=0 is given to the one-dimensional map circuit 51 through the DA converter 65 and the CMOS switch 67. For example, in a system adopting the DA converter 65 having the quantization resolution of 12 bits, types of the initial values x(0) that can be given reach $2^{12}$=4096.

External clocks (discrete times t) given to the input terminals 77 and 79 are set as rectangular waves that are not superposed on each other. The maximum clock frequency in this case controls the processing speed of this pseudo random number generator. The processing speed is decided depending on an internal state decision speed of the one-dimensional map circuit. When individual parts are breadboarded on a printed board, the clock frequency can be increased up to 20 kHz. This one-dimensional map circuit aims to be made into a chip as an integrated circuit using a standard CMOS integrated circuit technology. In the manufacturing of a prototype thereof on the assumption that the minimum dimension is equal to 0.8 μm, it ha,is been confirmed by a simulation that this one-dimensional map circuit acts on a clock frequency of 1 MHz.

The AD converters 49 and 57 outputting 1-bit data receive the respective outputs of the one-dimensional map circuits 43 and 51 through the CMOS switches 45 and 53, which open and close alternately in synchronization with the external clocks. Then, the AD converters 49 and 57 output binary code sequences each in accordance with input levels.

Specifically, by a comparator, each of the AD converters 49 and 57 compares an output voltage of each of the one-dimensional map circuits 43 and 51 with a reference voltage obtained by dividing an applied voltage by a pair of resistors rA and rB. Then, each of the AD converters 49 and 57 creates a signal of "0" or "1" by converting the voltage selected in accordance with a magnitude relationship of the both voltages. As the external clocks (discrete time t) proceed, binary code time series data are taken out alternately from output terminals 59 and 61. The binary code time series data that are taken out are array data, each having a random number with "0" and "1" mixed randomly. When a symmetry of the input/output characteristics owned by each of the one-dimensional map circuits 43 and 51 is maintained well, occurrence frequencies of "0" and "1" become approximately equal to each other. In this case, isolated "0" or "1" occurs at a frequency twice that of a value having continuous numbers such as "00" and "11." A binary code time series is obtained, in which both of the binary code time series taken out alternately from the respective output terminals 59 and 61 as described above are arrayed in accordance with an integral time series. Thus, the pseudo random number of the chaotic time series can be generated.

When viewing a world from a viewpoint of the chaos, two same things are never present in the world. Moreover, when paying attention to the respective input/output characteristics owned by a one-dimensional map circuit, it is pretty difficult to maintain a symmetry thereof completely. Furthermore, it is also pretty difficult to allow the respective input/output characteristics owned by the pair of one-dimensional map circuits 43 and 51 to coincide with each other completely. In addition, no assurance exists that the AD converters 49 and 57 carry out the same quantization. In order to wipe away various doubts as described above, it can be said to be extremely effective for the pseudo random number generator to be implemented as hardware because such hardware implementation makes it possible to produce the same integrated circuits through industrial mass production processes.

In the industrial technology of the chaos, the maintaining of the initial value sensitivity is an extremely important factor. In the present invention, the initial value sensitivity is given through the DA converter 65. Specifically, with regard to the pair of outputs 59, 61 of the binary code time series with initial values different from each other as starting points, the both are not superposed on each other even if they are to be superposed while shifting phases thereof in any manner. Thus, the time series are obtained, in which both auto-correlations and a cross-correlation are sufficiently small.

Now, a binary code time series, in which values taken out alternately from the output terminals 59 and 61 are arrayed in time series, will be defined as Y(t). In examples where periodic sequences are cut out to be made as PN signals, it is only an example that, for example, the binary sequence PN signal of 64-bit period is cut into Y(0) to Y(63), Y(64) to Y(127), . . . If the inner state of the chaos is observed up to t=$2^{16}$=65536, then 1024 types of binary sequence PN signals of 64-bit period are obtained. When the quantization resolution of the DA converter 65 giving the initial values is set at 12 bits, the initial values can be given in $2^{12}$=4096 ways. The types of the PN signals obtained in this case reach 4,194,304.

However, there is no assurance that all the types of the PN signals thus taken out can be used independently. This is because the unpredictability exerted by the sequence of the chaotic codes as the PN signals greatly depends on parameters such as the individual input/output characteristics owned by the one-dimensional map circuit and the given initial values. Hence, with regard to the PN signals thus taken out, it is necessary to investigate the auto-correlations and cross-correlation thereof while changing the phases and to verify in advance that the degrees of correlation are sufficiently small in the sequence other than the period.

In the above-described pseudo random number generator 14, the symmetry of each input/output characteristics owned by each of the one-dimensional map circuits 43 and 51 directly affects output distributions of "0" and "1" in the binary code time series taken out from each of the output terminals 59 and 61. In general, in the case of an ideal pseudo random number, the output distributions of "0" and "1" become even in ratio. When it is desired that the pseudo random number generator 14 act in such a manner, it is satisfactory that the one-dimensional map circuits 43 and 51 may be designed such that the one-dimensional map circuits 43 and 51 have input/output characteristics equal to each other, and that the symmetries thereof are maintained well.

However, the pseudo random number generator as the industrial technology does not necessarily require that the output distributions of "0" and "1" become even in ratio. The reason is as follows. Only if the necessary condition that the auto-correlations and the cross-correlation when shifting the phases are sufficiently small is satisfied, no disadvantage occurs from a viewpoint of the confidentiality of the cipher even if the ratio of the output distributions of "0" and "1" is biased in a cryptogram code of a stream cipher. Particularly, the way of thinking as below can be adopted. Specifically, because a third party certainly fails to decipher a cryptogram code when it attempts to decipher the cryptogram code on the assumption that a symmetry thereof is maintained well in the case where the one-dimensional map circuits 43 and 51 are dared to be designed so that the symmetry is spoiled, robustness of the cryptographic system is rather strengthened.

Moreover, there is no necessity of making the input/output characteristics owned by the one-dimensional map circuits 43 and 51 equivalent to each other. Each of the one-dimensional map circuits 43 and 51 can be realized by giving weights to the respective transistors as constituents of its own so that the weights are intentionally made different from one another. Furthermore, even if a design is made so that the input/output characteristics owned by the circuits 43 and 51 are made equivalent to each other, the equivalence of the input/output characteristics of their own can be broken by giving external adjustment voltages different from each other for each of the circuits 43 and 51 independently. Furthermore, a design may be made such that distorted input/output characteristics are combined with each other, aiming to expand a dynamic range of the map.

In the pseudo random number generator 14 described above, on the assumption that the DA converter and the clock generator are not included in an object to be made into one chip, as shown in FIG. 10, a pseudo random number generator can be realized, in which a sufficiently small-scale integrated circuit is made into one chip. While the chaos generation loop 63 including the pair of one-dimensional map circuits 43 and 51 as principal portions of the pseudo random number generator 14 is constituted of an analog circuit, the DA converter and the clock generator can be constituted of digital circuits. Therefore, it will also be facilitated to make an integrated circuit including all of the above into one chip.

In general, the CMOS integrated circuit is designed and realized in the enhanced mode. However, preferably, the CMOS source follower at the first stage, which is a constituent of each of the one-dimensional map circuits 43 and 51 included in the pseudo random number generator 14, is designed and realized in the depression mode. With such a constitution, the MOS transistor can be designed so that a weight thereof is reduced, and thus a well-balanced mask design of the one-dimensional map circuit can be realized.

The symmetries of the input/output characteristics of the one-dimensional map circuits 43 and 51 and the parameters including matching or unmatching between the input/output characteristics owned by the pair of one-dimensional map circuits 43 and 51 are combined with the initial value sensitivity particular to the chaos, thus breaking the occurrence balance of "0" and "1" of the obtained binary sequences finely. A swing phenomenon particular to the chaos, which is originated from variation of the parameters as described above, can contribute to the improvement of the robustness of the chaotic stream cipher.

THIRD EMBODIMENT

Figure 11:
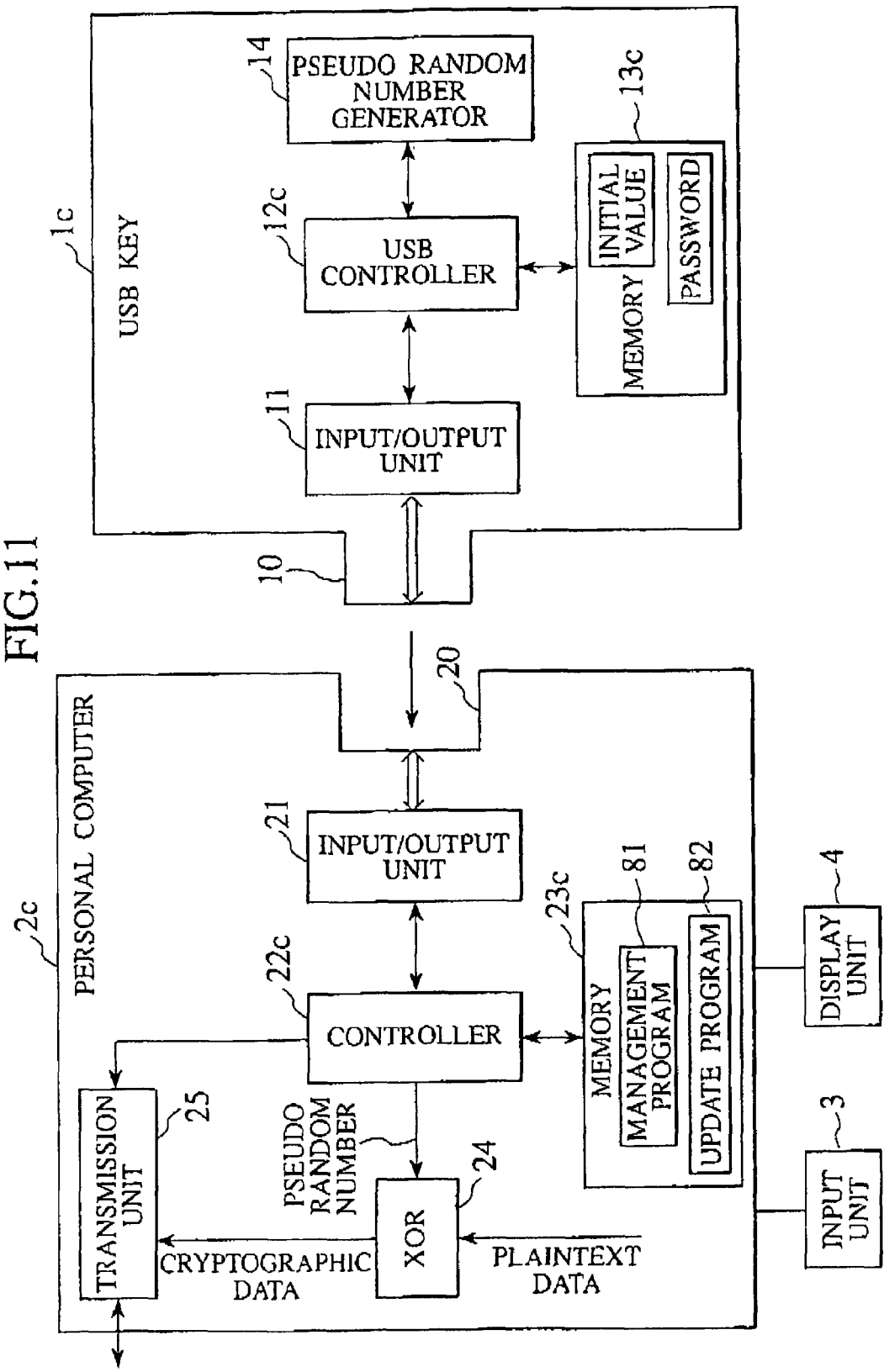
FIG. 11 is a block diagram showing a constitution of a cryptographic key management device of a third embodiment according to the present invention.

Next, description will be made in detail for a cryptographic key management device of a third embodiment according to the present invention, FIG. 11 is a block diagram showing a constitution of the cryptographic key management device of the third embodiment according to the present invention. The cryptographic key management device shown in FIG. 11 manages a USB key 1c constituted to be freely attachable and detachable to/from a personal computer 2c, and is characterized in that the personal computer 2c can rewrite a program of a memory 13c in the USB key 1c.

Figure 12:
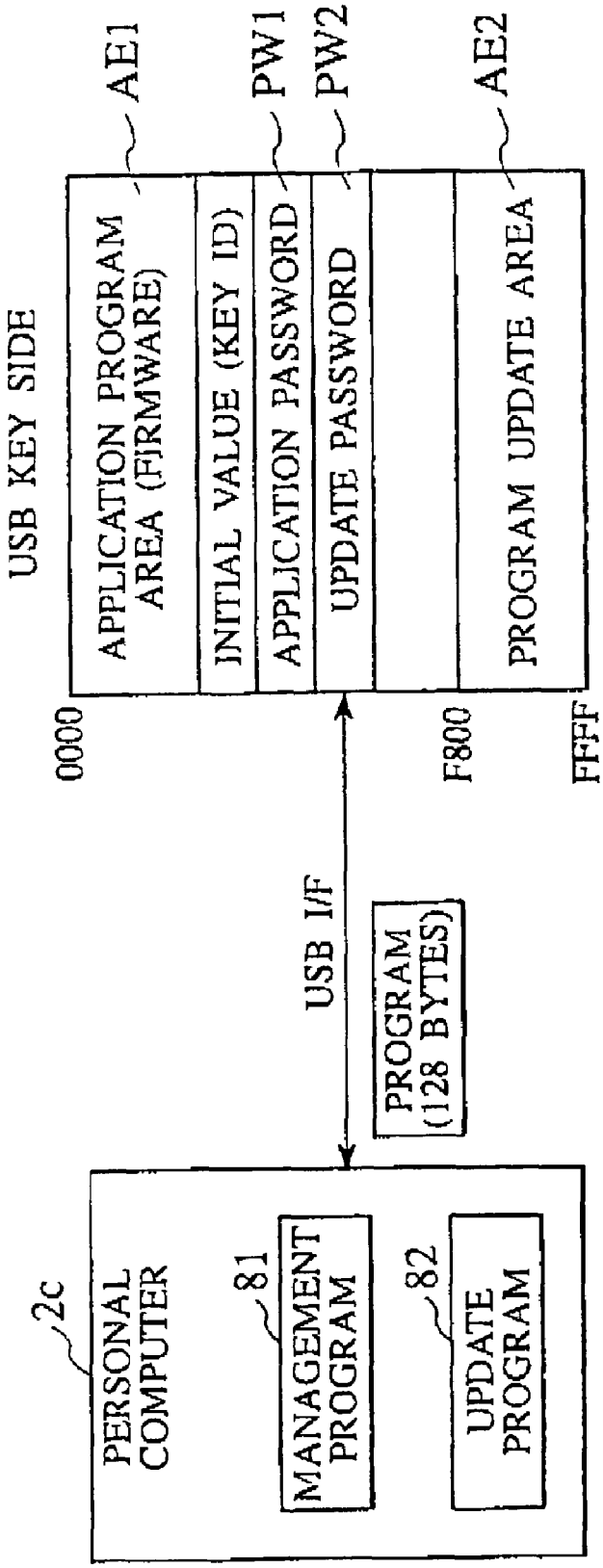
FIG. 12 is a diagram showing a principal constitution of a personal computer of the cryptographic key management device of the third embodiment and a memory region constitution of a memory in a USB key thereof.

In FIG. 11, the USB key 1c is constituted by having an input/output unit 11, a USB controller 12c, a memory 13c, and a pseudo random number generator 14. The memory 13c is an EEPROM, in which information is not deleted even if a power source is turned off, and data writing and deletion are possible, that is, a flash memory. As shown in FIG. 12, the memory 13c has an application program area AE1 for storing an application program from an address (0000), an initial value, an application password PW1 for permission and refusal of use of the application program, an update password PW2 for indicating permission and refusal of update of the application program of the application program area AE1 (hereinafter, referred to as an update), and a program update area AE2 for storing the update program in a unit of a predetermined length (for example, 128 bytes) in an area from an address (F800) to an address (FFFF).

The personal computer 2c is constituted by having an input/output unit 21, a controller 22c, a memory 23c, an XOR 24 and a transmission unit 25. An input unit 3 and a display unit 4 are connected to the personal computer 2c. Note that, while the personal computer 2c creating cryptographic data is exemplified as a personal computer, a personal computer decrypting the cryptographic data, for example, the personal computer 2b shown in FIG. 5 may be used instead.

The memory 23c has a management program 81 for managing the memory 13c of the USB key 1c and an update program 82. When updating the application program of the application program area in the memory 13c of the USB key 1c, the controller 22c sends out a delete command to the USB key 1c to delete the update password therefrom. Then, after deleting the update password, the controller 22c transmits the update program in the unit of the predetermined length to the USB key 1c.

The USB controller 12c in the USB key 1c turns into an update mode by the deletion of the update password. The USB controller 12c stores the update program from the personal computer 2c in the unit of the predetermined length in the program update area, and transports the update program, which is stored in the program update area, in the unit of the predetermined length to the application program area.

Figure 13:
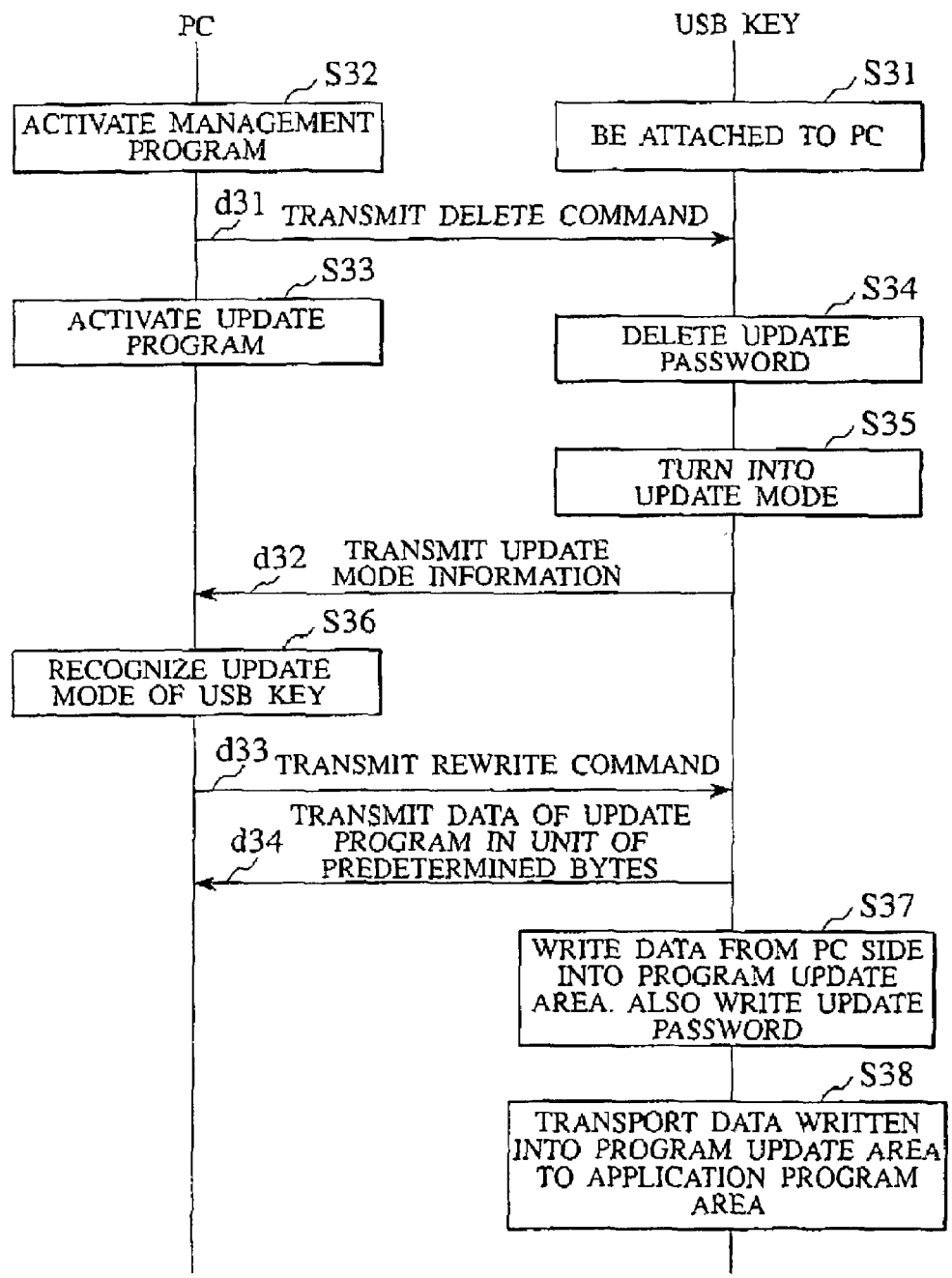
FIG. 13 is a diagram showing a sequence for rewriting a program of the memory in the USB key from the personal computer of the cryptographic key management device of the third embodiment.

Next, description will be made for a processing of rewriting the program of the memory in the USB key from the personal computer of the cryptographic key management device of the third embodiment with reference to FIG. 13.

First, the USB key 1c is attached to the personal computer 2c (Step S31). When updating the application program in the application program area in the memory of the USB key 1c, the personal computer 2c activates the management program

81 (Step S32). Then, the personal computer 2c transmits the delete command for deleting the update password to the USB key 1c (d31). Furthermore, the personal computer 2c activates the update program (Step S33).

Meanwhile, in the USB key 1c, the USB controller 12c deletes an update password in the memory 13c by the received delete command (Step S34), and turns into the update mode (Step S35). Then, the USB key 1c transmits update mode information to the personal computer 2c (d32).

The personal computer 2c recognizes that the USB key 1c is in the update mode from the received update mode information (Step S36). After transmitting a rewrite command to the USB key 1c (d33), the personal computer 2c transmits data of the update program in a unit of predetermined bytes to the USB key 1c (d34).

Meanwhile, in the USB key 1c, the USB controller 12c writes the update program from the personal computer 2c in the unit of predetermined bytes into the program update area in accordance with the received rewrite command. In this case, since an update password is included in the update program, the update password is also written into the memory 13c (Step S37).

Furthermore, the USB controller 12c transports the update program stored in the program update area in the unit of predetermined bytes to the application program area (Step S38).

Hence, the application program in the memory of the USB key 1c can be easily rewritten from the personal computer 2c. Moreover, the rewrite of the application program is determined depending on whether or not the update password exists. Therefore, only a specific person can rewrite the application program.

Figure 14:
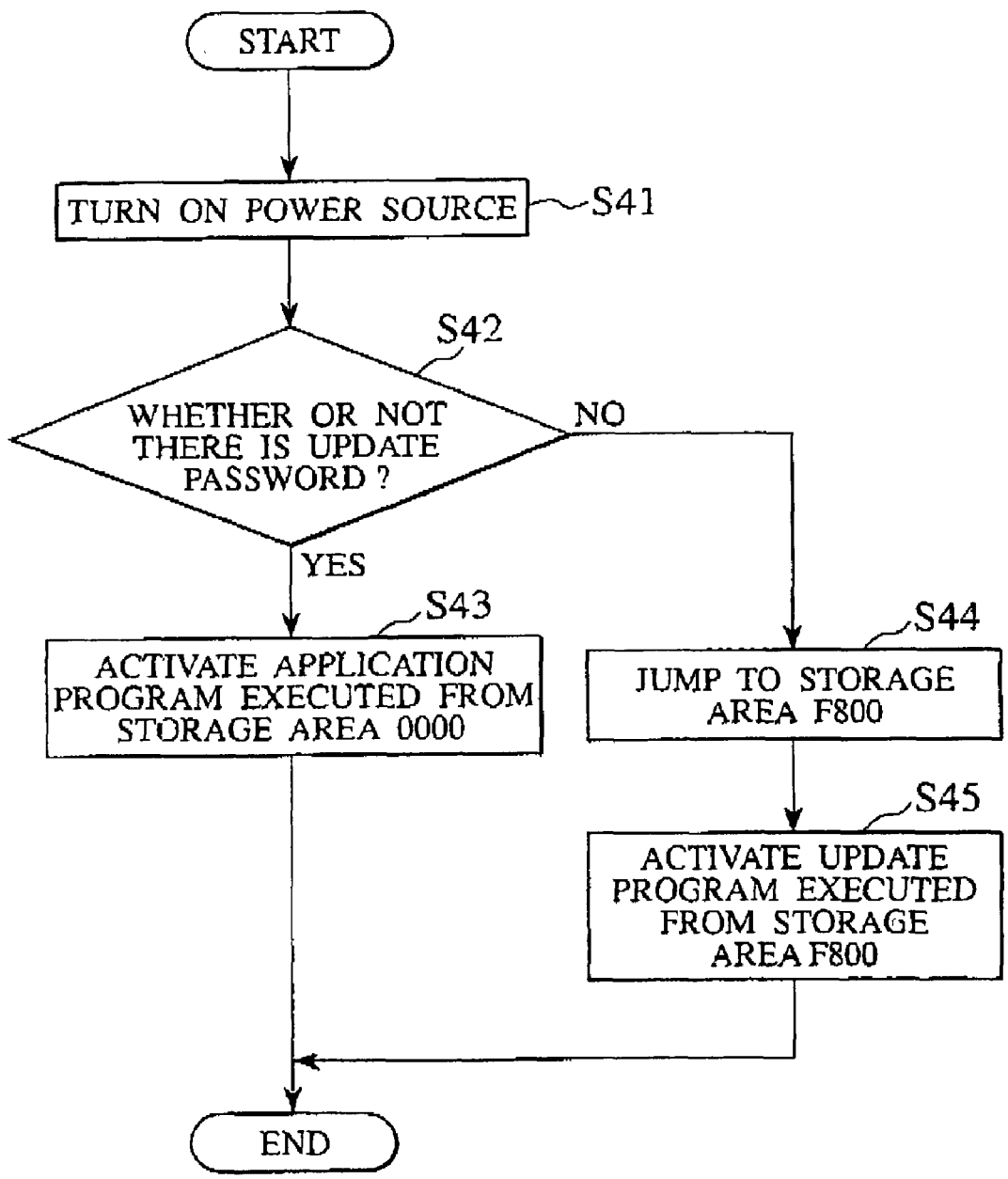
FIG. 14 is a flowchart showing activation of an application program or an update program of the memory in the USB key of the cryptographic key management device of the third embodiment.

In the above, description has been made only for the processing of rewriting the application program. Description will be made for activation of the application program and the update program in the memory in the USB key with reference to FIG. 14.

First, when the power source is turned on (Step S41), the USB controller 12c of the USB key 1c determines whether or not there is the update password in the memory 13c (Step S42). When there is the update password, the USB controller 12c activates the application program in the application program area, and executes a processing from the address (0000) as the storage area (Step S43). Specifically, a usual processing can be carried out by activating the application program.

Meanwhile, when there is not the update password, the process jumps to an address (F800) in the storage area (Step S44), the update program in the program update area is activated, and a processing is executed from the address (F800) (Step S45). Specifically, the update processing can be carried out by activating the update program.

FOURTH EMBODIMENT

Figure 15:
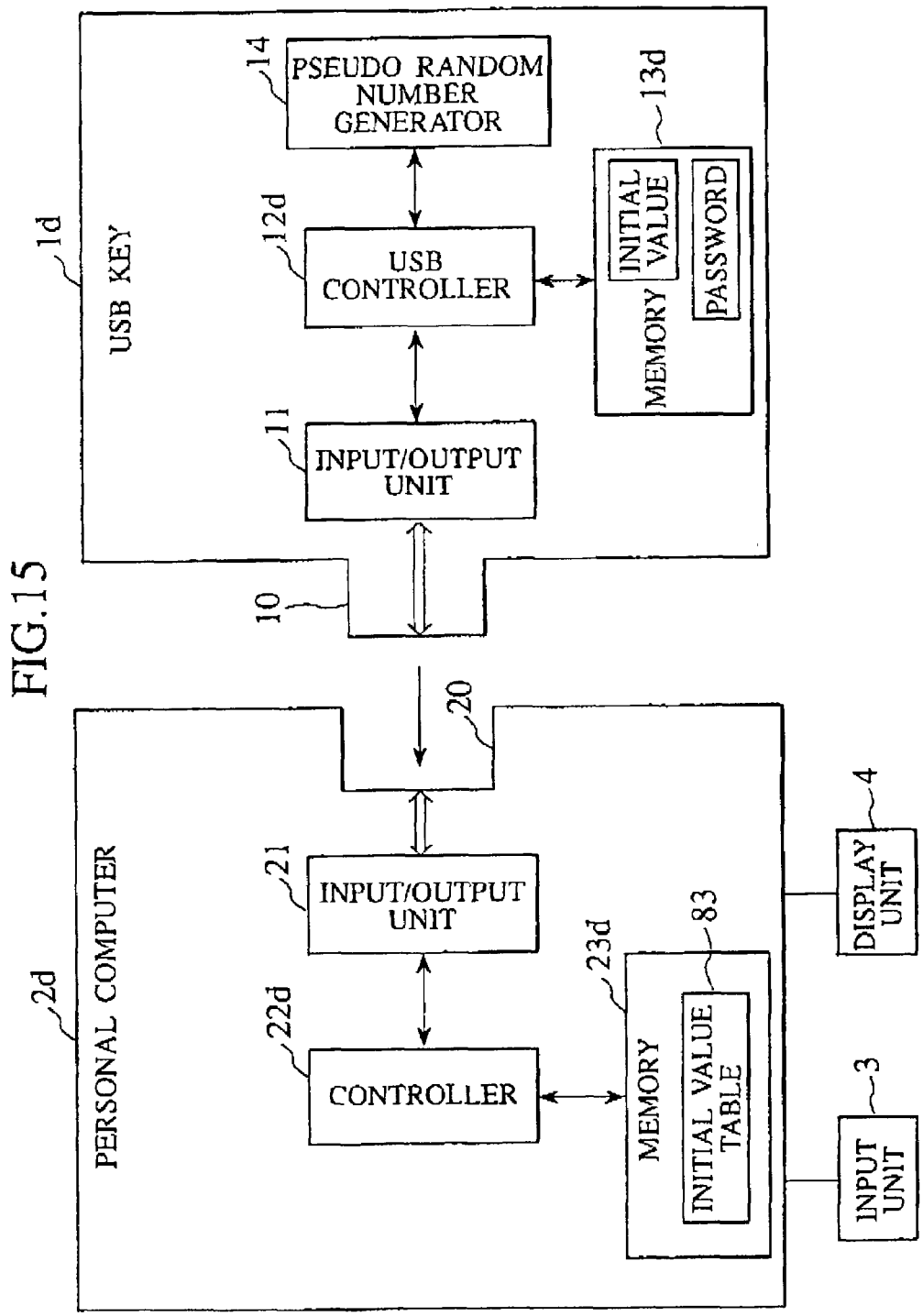
FIG. 15 is a block diagram showing a constitution of a cryptographic key management device of a fourth embodiment according to the present invention.

Next, description will be made in detail for a cryptographic key management device of a fourth embodiment according to the present invention. FIG. 15 is a block diagram showing a constitution of a cryptographic key management device of the fourth embodiment according to the present invention. The cryptographic key management device shown in FIG. 15 manages a USB key 1d constituted to be freely attachable and detachable to/from a personal computer 2d, and is characterized in that the personal computer 2d can register an initial value of a chaotic function in a memory 13d in the USB key 1d.

In FIG. 15, the USB key 1d is constituted by having an input/output unit 11, a USB controller 12d, a memory 13d, and a pseudo random number generator 14.

The personal computer 2d is constituted by having an input/output unit 21, a controller 22d, and a memory 23d. An input unit 3 and a display unit 4 are connected to the personal computer 2d. The input unit 3 inputs a product number of the USB key and the initial value for each USB key 1d. The controller 22d allows an initial value table 83 to store the product number of the USB key and the initial value for each USB key 1d, which are inputted by the input unit 3.

As shown in FIG. 16, the memory 23d has the initial value table 83 storing the product number of the USB key and the initial value (key ID) of the chaotic function, which are made to correspond to each other, for each USB key 1d. Upon being equipped with the USB key 1d, the controller 22d reads out the initial value corresponding to the product number of the USB key 1d from the initial value table 83, and transmits the initial value to the USB key 1d. The USB controller 12d of the USB key 1d allows the memory 13d to store the initial value sent from the personal computer 2d.

Next, description will be made for a processing of preparing the initial value table by the personal computer of the cryptographic key management device of the fourth embodiment with reference to FIG. 17.

First, a determination is made as to whether or not the product number of the USB key 1d has been inputted (Step S51). In the case where the product number of the USB key 1d has been inputted, the product number of the USB key 1d is stored in the initial value table 83 (Step S52).

Next, a determination is made as to whether or not the initial value has been inputted (Step S53). In the case where the initial value has been inputted, the initial value is stored in the initial value table 83 (Step S54).

Next, a determination is made as to whether or not the storing processing is terminated for all the USB keys 1d (Step S55). In the case where the storing processing is not terminated for all the USB keys 1d, the processing returns to Step S51, from which the processing is executed repeatedly. With such a processing, the initial value table 83 as shown in FIG. 16 can be prepared, and by the prepared initial value table 83, the initial value can be managed for each USE key 1d.

Figure 18:
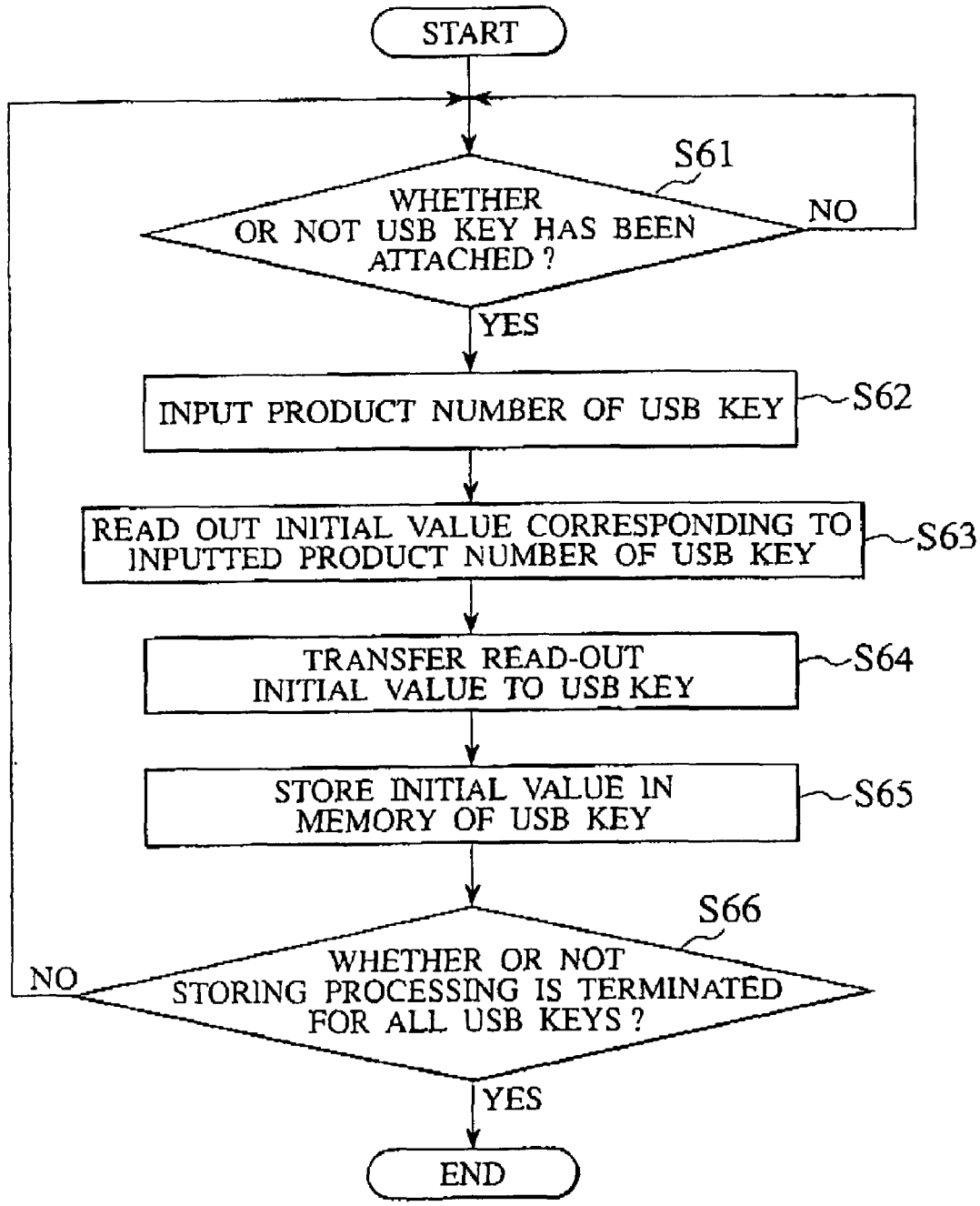
FIG. 18 is a flowchart showing a registration processing of an initial value to a memory of a USB key from the personal computer of the cryptographic key management device of the fourth embodiment according to the present invention.

Next, description will be made for a processing of registering the initial value from the personal computer 2d of the cryptographic key management device of the fourth embodiment to the memory 13d of the USB key 1d with reference to FIG. 18.

First, the personal computer 2d determines whether or not the USB key 1d has been attached thereto (Step S61). When the USB key 1d has been attached thereto, the product number of the USB key 1d is inputted thereto (Step S62).

Then, the controller 22d reads out the initial value corresponding to the inputted product number of the USB key 1d from the initial value table 83 (Step S63), and transmits the read-out initial value to the USB key 1d (Step S64).

Next, the USB key 1d stores the initial value from the personal computer 2d in the memory 13c (Step S65).

Next, a determination is made as to whether or not the processing of registering the initial value is terminated for all the USB keys 1d (Step S66). In the case where such initial value registration processing is not terminated for all the USB keys 1d, the processing returns to Step S61, from which the processing is executed repeatedly.

Hence, from the personal computer 2d, the initial value corresponding to the USB key 1d can be registered in the memory 13d in the USB key 1d for each USB key 1d.

Although the initial value has been written into an IC of another chip heretofore, the initial value can be written into the flash memory of the CPU in this embodiment.

FIFTH EMBODIMENT

Figure 19:
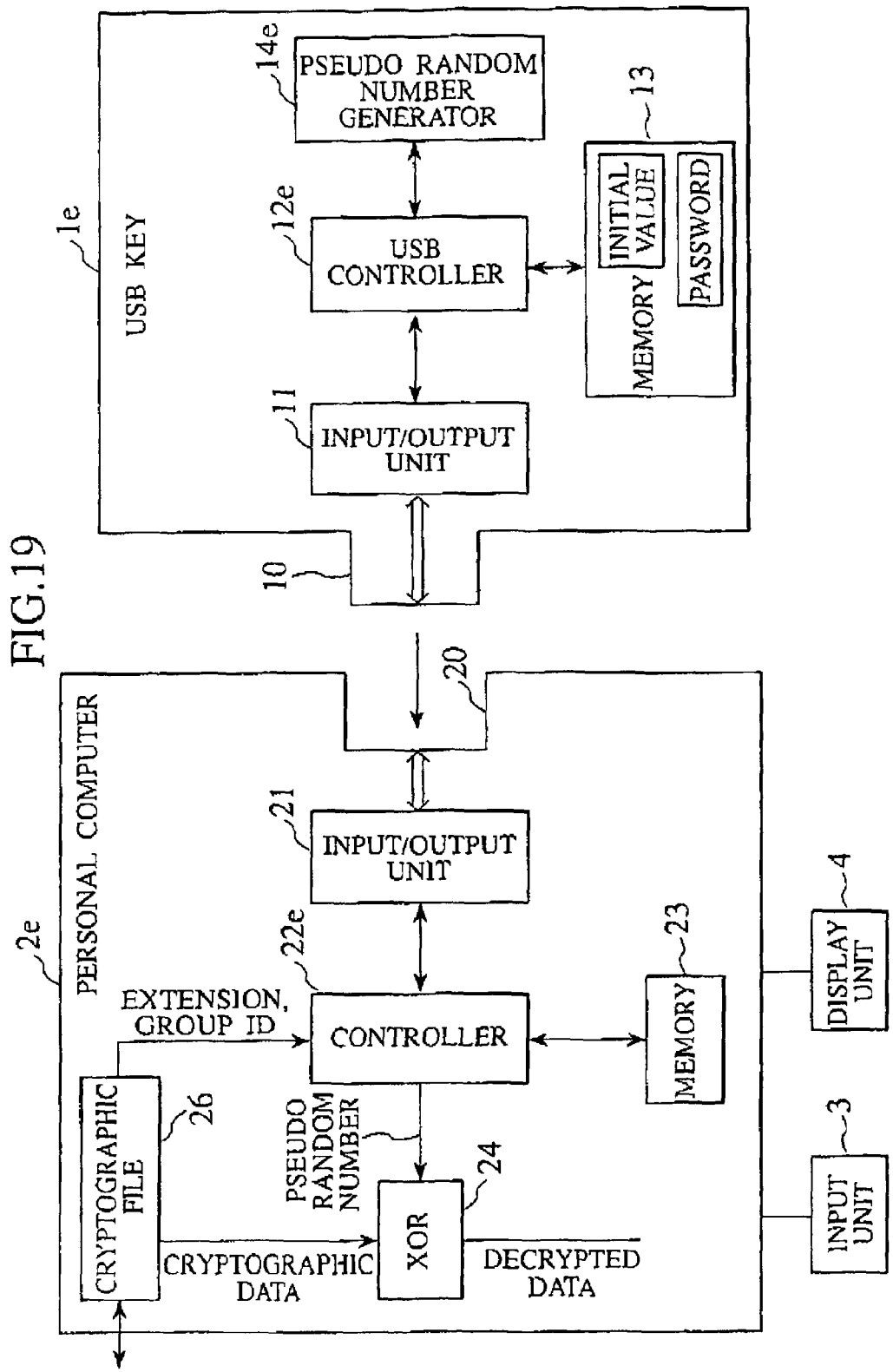
FIG. 19 is a block diagram showing a constitution of a decryption device of a fifth embodiment according to the present invention.

Next, description will be made in detail for a decryption device of a fifth embodiment according to the present invention. FIG. 19 is a block diagram showing a constitution of the decryption device of the fifth embodiment according to the present invention. The decryption device shown in FIG. 19 decrypts cryptographic data by use of a USB key 1e constituted to be freely attachable and detachable to/from a personal computer 2e, and is characterized in that it has a group password as an initial value to make it possible to share a cryptographic file having cryptographic data in a group.

Figure 20:
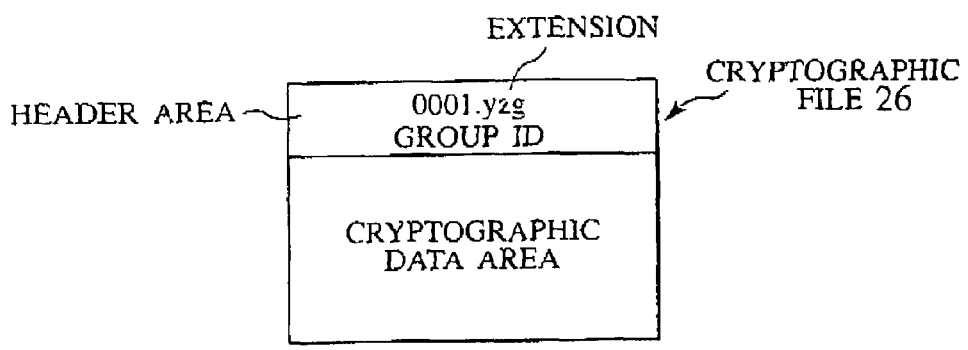
FIG. 20 is a diagram showing a constitution of a cryptographic file in a personal computer of the decryption device of the fifth embodiment according to the present invention.

The personal computer 2e is constituted by having an input/output unit 21, a controller 22e, a memory 23, an XOR 24 and a cryptographic file 26. An input unit 3 and a display unit 4 are connected to the personal computer 2e. As shown in FIG. 20, the cryptographic file 26 has the cryptographic data in a cryptographic data area. Moreover, in a header area, the cryptographic file 26 has an extension (yzg) as group mode information for indicating that a plurality of users can use the cryptographic data and has a group ID as a group password inherent in the plurality of users who can use the cryptographic data.

The controller 22e determines whether or not an ID inputted from the input unit 3 has coincided with the group ID stored in the cryptographic file 26. When the controller 22e determines that the ID inputted from the input unit 3 has coincided with the group ID, the controller 22e transmits the group ID as an initial value of a chaotic function to the USB key 1e, and also transmits a data size of the cryptographic data thereto. The XOR 24 receives, as a cipher key, a pseudo random number of a chaotic time series, which is generated in a pseudo random number generator 14e, and also receives the cryptographic data from the cryptographic file 26. Then, the XOR 24 decrypts the cryptographic data by use of the pseudo random number.

The USB key 1e is constituted by having an input/output unit 11, a USB controller 12e, a memory 13 and the pseudo random number generator 14e. The pseudo random number generator 14e generates the pseudo random number of the chaotic time series based on the data size of the cryptographic data, the chaotic function and the group ID as the initial value of the chaotic function from the personal computer 2e.

Figure 21:
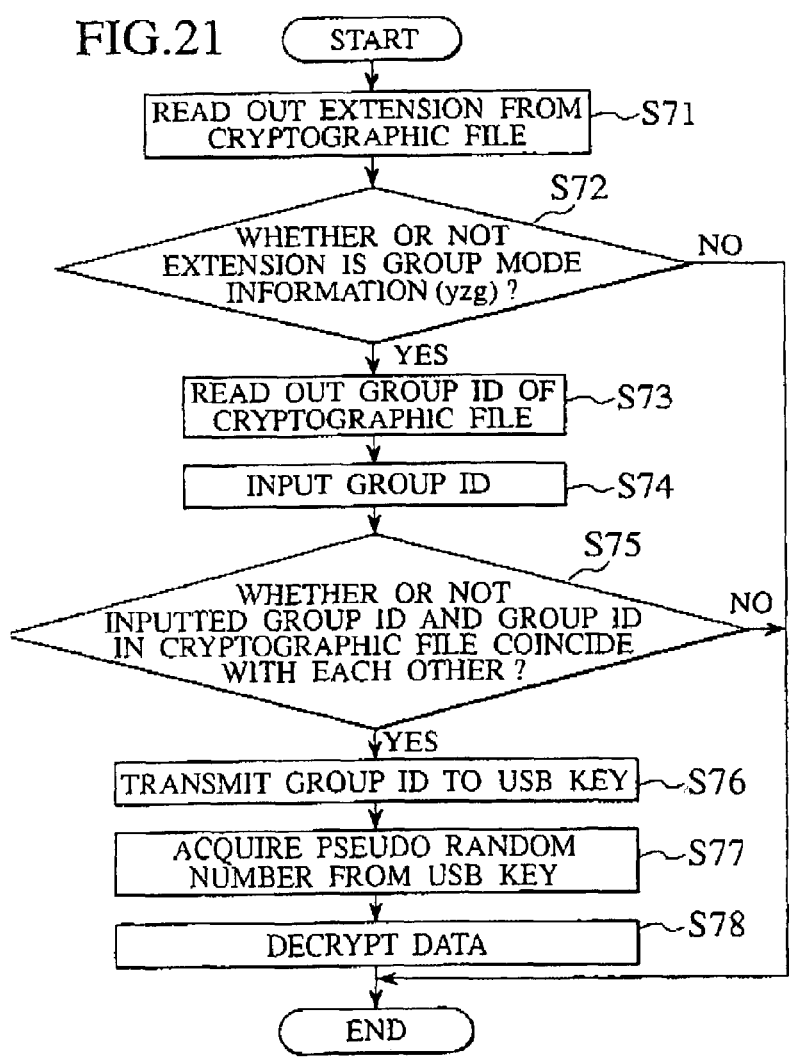
FIG. 21 is a flowchart showing a decryption processing in the decryption device of the fifth embodiment according to the present invention.

Next, description will be made for a decryption processing of the decryption device of the fifth embodiment with reference to FIG. 21.

First, the controller 22e of the personal computer 2e reads out an extension from the cryptographic file 26 (Step S71), and determines whether or not the extension is yzg as the group mode information (Step S72). When the extension is yzg, the controller 22e reads out the group ID of the cryptographic data 26 (Step S73).

Next, upon receiving the group ID (Step S74), the controller 22e determines whether or not the inputted group ID and the group ID stored in the cryptographic file 26 coincide with each other (Step S75). When the group IDs coincide with each other, the controller 22 transmits the group ID and the data size of the cryptographic data to the USB key 1e.

Meanwhile, the USB key 1e generates the pseudo random number of the chaotic time series based on the data size of the cryptographic data, the chaotic function and the group ID as the initial value of the chaotic function from the personal computer 2e. Then, the USE key 1e transmits the generated pseudo random number of the chaotic time series as the cipher key to the personal computer 2e.

The personal computer 2e acquires the pseudo random number from the USB key 1e (Step S77). The XOR 24 decrypts the cryptographic data in the cryptographic file 26 by use of the pseudo random number from the USB key 1e. Specifically, the group ID is defined as the initial value of the chaotic function, thus making it possible to share the cryptographic file 26 in the group composed of the plurality of users.

Moreover, only when there is the extension yzg as the group mode information and the inputted ID coincides with the group ID stored in the cryptographic file 26, the cryptographic file 26 can be shared in the group composed of the plurality of users. Specifically, the confidentiality of the data can be further improved.

According to the first aspect of the present invention, since the so pseudo random number generator (cryptographic algorithm) is not made to reside in the external device but built in the body of the cryptographic key, it becomes difficult for the third party to decipher the pseudo random number of the chaotic time series as the cipher key. Thus, the data on the personal computer owned by a person can be prevented from being browsed by the third party.

According to the second aspect of the present invention, the pair of one-dimensional map circuits iterate the mapping alternately, and the analog outputs obtained by the mapping are feedbacked in the crossing manner. Therefore, the divergence and convergence of the analog outputs woven by the pair of one-dimensional map circuits are combined with the initial value sensitivity particular to the chaos, thus breaking the occurrence balance of "0" and "1" of the obtained binary sequences finely. Such a swing phenomenon particular to the chaos can contribute to the improvement of robustness of the stream cipher using the chaos.

According to the third aspect of the present invention, the initial value sensitivity is given through the DA converter. Therefore, with regard to the pair of binary sequences with the initial values different from each other as starting points, the both are not superposed on each other even if they are to be superposed while shifting phases thereof in any manner. Thus, it is made possible to obtain the chaotic time series in which both of the auto-correlations and the cross-correlation are sufficiently small.

Furthermore, according to the fourth aspect of the present invention, it is made possible to adjust the input/output characteristics owned by the one-dimensional map circuit from the outside. Consequently, the types of the chaotic time series that can be taken out can be further increased.

According to the fifth aspect of the present invention, when the cryptographic key is attached to the external device, the external device transmits the data size of the plaintext data to the cryptographic key, and encrypts the plaintext data by use of the pseudo random number of the chaotic time series as the cipher key, the pseudo random number being sent from the cryptographic key. Therefore, the similar effect to that of the first aspect is obtained, and the cryptographic data having high confidentiality can be created.

According to the sixth aspect of the present invention, the exclusive-OR operation for the pseudo random number obtained by the pseudo random number generator and the plaintext data is executed, thus making it possible to encrypt the plaintext data.

According to the seventh aspect of the present invention, the external device permits the encryption processing when the password inputted from the input unit and the first password stored in the cryptographic key coincide with each other. Therefore, the confidentiality can be enhanced.

According to the eighth aspect of the present invention, the first external device transmits the data size of the plaintext data to the first cryptographic key upon being equipped with the first cryptographic key, and encrypts the plaintext data by use of the pseudo random number of the chaotic time series from the first cryptographic key to create the cryptographic data. Moreover, the second external device receives the cryptographic data from the first external device, and transmits the data size of the cryptographic data to the second cryptographic key upon being equipped with the second cryptographic key, then decrypts the cryptographic data by use of the pseudo random number of the chaotic time series from the second cryptographic key. Therefore, the plaintext data on the transmission side can be obtained on the reception side.

According to the ninth aspect of the present invention, the first external device executes the exclusive-OR operation for the pseudo random number obtained by the pseudo random number generator in the first cryptographic key and the plaintext data to encrypt the plaintext data, Moreover, the second external device executes the exclusive-OR operation for the pseudo random number obtained by the pseudo random number generator in the second cryptographic key and the cryptographic data to decrypt the cryptographic data. Therefore, the plaintext data on the transmission side can be obtained on the reception side.

According to the tenth aspect of the present invention, the encryption processing is permitted on the transmission side when both of the passwords coincide with each other, and the decryption processing is permitted on the reception side when both of the passwords coincide with each other. Therefore, the confidentiality can be enhanced on each of the transmission and reception sides.

According to the eleventh aspect of the present invention, the external device sends out the delete command to the cryptographic key to delete the update password therefrom when updating the program of the program area in the memory. Then, the external device transmits the update program in the unit of the predetermined length to the cryptographic key after deleting the update password. Meanwhile, the cryptographic key turns into the update mode by the deletion of the update password, and stores the update program from the external device in the unit of the predetermined length in the program update area. Then, the cryptographic key transports the update program in the unit of the predetermined length to the program area, the update program being stored in the program update area. Therefore, the program in the memory of the cryptographic key can be rewritten from the external device easily, and the rewrite of the program is determined depending on whether or not the update password exists. Therefore, only the specific person can rewrite the program.

According to the twelfth aspect of the present invention, the cryptographic key can store the update password from the external device in the memory when storing the update program from the external device in the program update area.

According to the thirteenth aspect of the present invention, the cryptographic key can activate the program of the program area when the update password is stored in the memory when the power source is turned on, thus making it possible to carry out the usual processing.

According to the fourteenth aspect of the present invention, the external device reads out the initial value corresponding to the cryptographic key number from the initial value table to transmit the initial value to the cryptographic key upon being equipped with the cryptographic key. Meanwhile, the cryptographic key stores the initial value from the external device in the memory, and generates the pseudo random number of the chaotic time series based on the initial value stored in the memory, the data size of the data and the chaotic function. Hence, from the external device, the initial value corresponding to the cryptographic key can be registered in the memory in the cryptographic key for each cryptographic key.

According to the fifteenth aspect of the present invention, when the input unit inputs the cryptographic key number and the initial value for each cryptographic key, the storage control units allows the initial value table to store tile cryptographic key number and the initial value for each cryptographic key, which are inputted from the input unit. Therefore, the initial value can be managed for each cryptographic key by the created initial value table.

According to the sixteenth aspect of the present invention, the external device transmits the group password and the data size of the cryptographic data to the cryptographic key when the inputted password coincides with the group password stored in the cryptographic file. Meanwhile, the cryptographic key generates the pseudo random number of the chaotic time series based on the data size of the cryptographic data from the external device, the chaotic function and the group password as the initial value of the chaotic function. Then, the cryptographic key transmits the generated pseudo random number of the chaotic time series as the cipher key to the external device. The external device decrypts the cryptographic data in the cryptographic file by use of the cipher key from the cryptographic key. Specifically, the group password is defined as the initial value, thus making it possible to share the cryptographic file in the group composed of the plurality of users.

According to the seventeenth aspect of the present invention, the external device determines whether or not the group mode information is in the cryptographic file. When the group mode information is in the cryptographic file, the external device requests input of the password. Therefore, only when there is the group mode information and the inputted password coincides with the group password stored in the cryptographic file, the cryptographic file can be shared in the group composed of the plurality of users.

The entire content of Japanese Patent Application No. P2001-351903 with a filing data of Nov. 16, 2001 is herein incorporated by reference.

Although the present invention has been described above by reference to certain embodiment, the invention is not limited to the embodiment described above and modifications will occur to those skilled in the art, in light of the teachings. The scope of the invention is defined with reference to the following claims.

What is claimed is:

1. A cryptographic key constituted to be freely attachable and detachable to/from an external device encrypting and decrypting data by use of a cipher key, the cryptographic key comprising:

a pseudo random number generator for generating a pseudo random number of a chaotic time series based on a data size of the data, a chaotic function and an initial value of the chaotic function; and a transmission/reception control unit for receiving the data size of the data from the external device and transmitting the pseudo random number of the chaotic time series as the cipher key to the external device, the pseudo random number being generated in the pseudo random number generator, when the cryptographic key is attached to the external device, wherein the pseudo random number generator includes:

a chaos generation loop constituted by including a pair of one-dimensional map circuits for generating the chaotic function, each having non-linear input/output characteristics, a pair of CMOS switches for alternately performing opening and closing actions for paths on output sides of the respective one-dimensional map circuits in synchronization with an external clock, and a pair of feedback loops for feedbacking analog outputs of the respective one-dimensional map circuits through the respective CMOS switches to input sides of the respective one-dimensional map circuits in a crossing manner; and a pair of AD converters for converting, into digital signals, the analog outputs of the respective one-dimensional map circuits, the analog outputs being taken out through the respective CMOS switches, and the respective one-dimensional map circuits iterate mapping alternately with the elapse of a discrete time defined by the external clock in the chaos generation loop to allow the pseudo random number generator to output binary sequences as chaotic time series through the respective AD converters.

2. The cryptographic key according to claim 1, wherein the pseudo random number generator further includes:

a DA converter for converting an initial value given in a digital signal mode into an analog signal; and a CMOS switch for performing opening and closing actions for a path on an output side of the DA converter in synchronization with the external clock.

3. The cryptographic key according to claim 1, wherein at least any one of the pair of one-dimensional map circuits is constituted to be capable of adjusting the input/output characteristics of its own in accordance with an external adjustment voltage.

4. An encryption device for encrypting plaintext data by use of a cipher key, the encryption device comprising:

a cryptographic key having a pseudo random number generator for generating a pseudo random number of a chaotic time series based on a data size of the plaintext data, a chaotic function and an initial value of the chaotic function; and an external device for transmitting the data size of the plaintext data to the cryptographic key upon being equipped with the cryptographic key, and for encrypting the plaintext data by use of the pseudo random number of the chaotic time series as the cipher key, the pseudo random number being sent from the cryptographic key, wherein the pseudo random number generator includes:

a chaos generation loop constituted by including a pair of one-dimensional map circuits for generating the chaotic function, each having non-linear input/output characteristics, a pair of CMOS switches for alternately performing opening and closing actions for paths on output sides of the respective one-dimensional map circuits in synchronization with an external clock, and a pair of feedback loops for feedbacking analog outputs of the respective one-dimensional map circuits through the respective CMOS switches to input sides of the respective one-dimensional map circuits in a crossing manner; and a pair of AD converters for converting, into digital signals, the analog outputs of the respective one-dimensional map circuits, the analog outputs being taken out through the respective CMOS switches, and the respective one-dimensional map circuits iterate mapping alternately with the elapse of a discrete time defined by the external clock in the chaos generation loop to allow the pseudo random number generator to output binary sequences as chaotic time series through the respective AD converters.

5. The encryption device according to claim 4, wherein the external device executes an exclusive-OR operation for the pseudo random number obtained by the pseudo random number generator and the plaintext data to encrypt the plaintext data.

6. The encryption device according to claim 4, wherein the cryptographic key stores a first password in advance, and the external device collates a password inputted from an input unit and the first password stored in the cryptographic key, and permits an encryption processing when both of the passwords coincide with each other.

7. A cryptographic key management device for managing a cryptographic key constituted to be freely attachable and detachable to/from an external device, wherein the cryptographic key includes:

a pseudo random number generator for generating a pseudo random number of a chaotic time series based on a data size of data, a chaotic function and an initial value of the chaotic function;

a transmission/reception control unit for receiving the data size of the data from the external device upon being attached to the external device, and for transmitting the pseudo random number of the chaotic time series as the cipher key to the external device, the pseudo random number being generated in the pseudo random number generator; and a memory having a program area for storing a program, an update password for indicating permission and refusal of update of the program of the program area, and a program update area for storing the update program, the external device includes:

a password deletion unit for sending out a delete command to the cryptographic key to delete the update password therefrom when updating the program of the program area in the memory; and a transmission unit for transmitting the update program in a unit of a predetermined length to the cryptographic key after deleting the update password, and the cryptographic key turns into an update mode by the deletion of the update password, and stores the update program from the external device in the unit of the predetermined length in the program update area, then transports the update program in the unit of the predetermined length to the program area, the update program being stored in the program update area.

8. The cryptographic key management device according to claim 7, wherein the transmission unit of the external device transmits the update program and the update password to the cryptographic key, and the cryptographic key stores the update password in the memory when storing the update program in the program update area.

9. The cryptographic key management device according to claim 8,
wherein the cryptographic key activates the program of the program area when the update password is stored in the memory when a power source is turned on.

10. A cryptographic key management device for managing a cryptographic key constituted to be freely attachable and detachable to/from an external device,
wherein the external device includes:
an initial value table storing a cryptographic key number and an initial value of a chaotic function for each cryptographic key, the cryptographic key number and the initial value being made to correspond to each other; and
a transmission unit for reading out the initial value corresponding to the cryptographic key number from the initial value table to transmit the initial value to the cryptographic key when the cryptographic key is attached to the external device, and
the cryptographic key includes:
a memory for storing the initial value from the external device; and
a pseudo random number generator for generating a pseudo random number of a chaotic time series based on the initial value stored in the memory, a data size of data and the chaotic function.

11. The cryptographic key management device according to claim 10,
wherein the external device includes:
an input unit for receiving the cryptographic key number and the initial value for each cryptographic key; and
a storage control unit for allowing the initial value table to store the cryptographic key number and the initial value for each cryptographic key, the cryptographic key number and the initial value being inputted from the input unit.

12. A decryption device for decrypting cryptographic data by use of a cryptographic key constituted to be freely attachable and detachable to/from an external device,
wherein the external device includes:
a cryptographic file storing the cryptographic data and a group password inherent in a plurality of users capable of using the cryptographic data;
a transmission unit for transmitting the group password and a data size of the cryptographic data to the cryptographic key when an inputted password coincides with the group password stored in the cryptographic file; and
a decryption unit for decrypting the cryptographic data in the cryptographic file by use of a cipher key from the cryptographic key, and
the cryptographic key includes:
a pseudo random number generator for generating a pseudo random number of a chaotic time series based on the data size of the cryptographic data from the external device, a chaotic function and the group password as an initial value of the chaotic function; and
a transmission/reception control unit for receiving the group password and the data size of the cryptographic data from the external device, and for transmitting the pseudo random number of the chaotic time series as the cipher key to the external device, the pseudo random number being generated in the pseudo random number generator.

13. The decryption device according to claim 9,
wherein the external device further includes:
a determination unit for determining whether or not group mode information for indicating that the plurality of users can use the cryptographic data is in the cryptographic file; and
a request unit for requesting input of the password when the group mode information is in the cryptographic file.

* * * * *

UNITED STATES PATENT AND TRADEMARK OFFICE
CERTIFICATE OF CORRECTION

PATENT NO. : 7,269,258 B2  Page 1 of 1
APPLICATION NO. : 10/294776
DATED : September 11, 2007
INVENTOR(S) : Tetsuya Ishihara et al.

It is certified that error appears in the above-identified patent and that said Letters Patent is hereby corrected as shown below:

In claim 4, column 27, lines 65-66, "feed backing" should read --feedbacking--.

Signed and Sealed this

Fourth Day of March, 2008

JON W. DUDAS
*Director of the United States Patent and Trademark Office*